United States Patent
Moroi

(10) Patent No.: US 10,848,641 B2
(45) Date of Patent: Nov. 24, 2020

(54) IMAGE FORMING APPARATUS AND AUTHENTICATION METHOD

(71) Applicant: Shohhei Moroi, Kanagawa (JP)

(72) Inventor: Shohhei Moroi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/701,873

(22) Filed: Dec. 3, 2019

(65) Prior Publication Data

US 2020/0106922 A1     Apr. 2, 2020

Related U.S. Application Data

(60) Continuation of application No. 16/112,024, filed on Aug. 24, 2018, now Pat. No. 10,530,965, which is a (Continued)

(30) Foreign Application Priority Data

Jan. 29, 2003   (JP) ................................ 2003-019721
Jan. 21, 2004   (JP) ................................ 2004-012904

(51) Int. Cl.
*G03G 15/00*       (2006.01)
*H04N 1/44*        (2006.01)
(Continued)

(52) U.S. Cl.
CPC ......... *H04N 1/4413* (2013.01); *G06F 21/629* (2013.01); *H04N 1/00244* (2013.01);
(Continued)

(58) Field of Classification Search
CPC ............ G03G 15/5016; G03G 15/5091; G06F 3/1222; G06F 3/1238; G06F 21/31; G06F 21/608; G06F 2221/2129
(Continued)

(56) References Cited

U.S. PATENT DOCUMENTS 5,694,222 A    12/1997 Yamada
5,784,664 A    7/1998  Nakamura et al.
(Continued)

FOREIGN PATENT DOCUMENTS

CN    1344383       4/2002
EP    164 440 A1    12/2001
(Continued)

OTHER PUBLICATIONS

European Office Action dated May 27, 2010 (5 pgs.).
(Continued)

*Primary Examiner* — Hoan H Tran
(74) *Attorney, Agent, or Firm* — Oblon, McClelland, Maier & Neustadt, L.L.P.

(57) ABSTRACT

An image forming apparatus including applications and system side software for providing system side services to the applications is provided, in which the image forming apparatus includes: an authentication module for displaying an authentication screen on an operation panel of the image forming apparatus, wherein the authentication module allows the image forming apparatus to display a screen for using the image forming apparatus instead of the authentication screen if authentication data input from the authentication screen satisfies an authentication condition, and wherein the authentication module is provided in the image forming apparatus separately from the system side software.

12 Claims, 22 Drawing Sheets

OPERATION PANEL

Related U.S. Application Data division of application No. 15/801,048, filed on Nov. 1, 2017, now Pat. No. 10,091,394, which is a division of application No. 15/190,987, filed on Jun. 23, 2016, now Pat. No. 9,826,122, which is a division of application No. 14/636,828, filed on Mar. 3, 2015, now Pat. No. 9,398,185, which is a division of application No. 14/178,946, filed on Feb. 12, 2014, now Pat. No. 8,995,863, which is a continuation of application No. 13/730,516, filed on Dec. 28, 2012, now Pat. No. 8,682,193, which is a continuation of application No. 13/282,122, filed on Oct. 26, 2011, now Pat. No. 8,380,099, which is a continuation of application No. 12/869,097, filed on Aug. 26, 2010, now Pat. No. 8,064,789, which is a continuation of application No. 12/496,193, filed on Jul. 1, 2009, now Pat. No. 7,809,297, which is a continuation of application No. 12/039,432, filed on Feb. 28, 2008, now Pat. No. 7,574,156, which is a continuation of application No. 11/408,027, filed on Apr. 21, 2006, now Pat. No. 7,362,983, which is a continuation of application No. 10/765,143, filed on Jan. 28, 2004, now Pat. No. 7,058,332.

(51) Int. Cl.
| | | |
|---|---|---|
| *G06F 21/62* | (2013.01) | |
| *H04N 1/00* | (2006.01) | |
| *H04N 1/32* | (2006.01) | |
| *H04N 1/34* | (2006.01) | |

(52) U.S. Cl.
CPC ..... *H04N 1/00278* (2013.01); *H04N 1/00305* (2013.01); *H04N 1/00344* (2013.01); *H04N 1/00474* (2013.01); *H04N 1/00838* (2013.01); *H04N 1/00856* (2013.01); *H04N 1/00912* (2013.01); *H04N 1/00925* (2013.01); *H04N 1/00965* (2013.01); *H04N 1/32561* (2013.01); *H04N 1/34* (2013.01); *G06F 2221/2135* (2013.01); *H04N 1/00204* (2013.01); *H04N 2201/0039* (2013.01); *H04N 2201/0049* (2013.01); *H04N 2201/0055* (2013.01); *H04N 2201/0075* (2013.01)

(58) Field of Classification Search
USPC ............ 399/75, 79–81; 358/1.15, 296, 501; 395/101, 114–117
See application file for complete search history.

(56) References Cited

U.S. PATENT DOCUMENTS

| | | | |
|---|---|---|---|
| 5,999,766 | A | 12/1999 | Hisatomi et al. |
| 6,064,836 | A | 5/2000 | Nakamura et al. |
| 6,313,921 | B1 | 11/2001 | Kadowaki |
| 6,327,446 | B1 | 12/2001 | Suzuki |
| 6,512,915 | B2 * | 1/2003 | Matsunoshita ....... G06F 21/608 399/366 |
| 6,615,353 | B1 | 9/2003 | Hashiguchi |
| 6,625,402 | B2 | 9/2003 | Takemoto |
| 6,978,096 | B2 | 12/2005 | Maeshima |
| 7,058,332 | B2 | 6/2006 | Moroi |
| 7,130,066 | B1 | 10/2006 | Kanematu |
| 7,170,626 | B2 | 1/2007 | Shijo et al. |
| 7,221,885 | B2 | 5/2007 | Sato |
| 7,327,478 | B2 | 2/2008 | Matsuda |
| 7,362,983 | B2 | 4/2008 | Moroi |
| 7,460,806 | B2 | 12/2008 | Saka et al. |
| 7,515,290 | B2 | 4/2009 | Negishi et al. |
| 2002/0062453 | A1 | 5/2002 | Koga |
| 2002/0113993 | A1 | 8/2002 | Reddy |
| 2002/0122203 | A1 | 9/2002 | Matsuda |
| 2002/0141761 | A1 | 10/2002 | Kondo |
| 2002/0149791 | A1 | 10/2002 | Ozawa et al. |
| 2005/0183141 | A1 | 8/2005 | Sawada |
| 2006/0050309 | A1 | 3/2006 | Someya |
| 2006/0256370 | A1 | 11/2006 | Murakawa |
| 2008/0084577 | A1 | 4/2008 | Mihira |

FOREIGN PATENT DOCUMENTS

| | | |
|---|---|---|
| JP | 11-41230 | 2/1999 |
| JP | 2002-108583 | 4/2002 |
| JP | 2002-149362 | 5/2002 |
| JP | 2002-351831 A | 12/2002 |
| JP | 2002-358593 A | 12/2002 |

OTHER PUBLICATIONS

Extended European Search Report dated Feb. 3, 2011, in Patent Application No. 10009950.6.

Office Action dated Oct. 21, 2015 in European Patent Application No. 04 250 438.1.

* cited by examiner

FIG.8A

```
mount  romfs   0×500000   ROM 0
mount  romfs   0×800000   ROM 1
exec   -2      /bin/Ⓐ
exec   -5      /bin/Ⓑ
exec   -3      /bin/Ⓒ
```

FIG.8B

```
exec   -2   /bin/Ⓓ
exec   -3   /bin/Ⓔ
```

■SYSTEM SETTING

|  | USE RESTRICTION, YES/NO | AUTHENTICATION MODE |
|---|---|---|
| COPY | YES | STANDARD |
| SCANNER | YES | ADDITIONAL |
| FAX | NO | – |
| ADDITIONAL APPLICATION 1 | YES | ADDITIONAL |
| ADDITIONAL APPLICATION 2 | YES | STANDARD |

AUTHENTICATION SCREEN A

IMAGE FORMING APPARATUS AND AUTHENTICATION METHOD

CROSS-REFERENCE TO RELATED APPLICATIONS

The present application is a continuation application of U.S. application Ser. No. 16/112,024, filed Aug. 24, 2018, which is a divisional of U.S. application Ser. No. 15/801, 048, filed Nov. 1, 2017, (now U.S. Pat. No. 10,091,394), which is a divisional of U.S. application Ser. No. 15/190, 987, filed Jun. 23, 2016, (now U.S. Pat. No. 9,826,122), which is a divisional of U.S. application Ser. No. 14/636, 828, filed Mar. 3, 2015, (now U.S. Pat. No. 9,398,185), which is a divisional of U.S. application Ser. No. 14/178,946 (now U.S. Pat. No. 8,995,863), filed Feb. 12, 2014, which is a continuation of U.S. application Ser. No. 13/730,516 (now U.S. Pat. No. 8,682,193), filed Dec. 28, 2012, which is a continuation of U.S. application Ser. No. 13/282,122 (now U.S. Pat. No. 8,380,099), filed Oct. 26, 2011, which is a continuation of U.S. application Ser. No. 12/869,097 (now U.S. Pat. No. 8,064,789), filed on Aug. 26, 2010, which is a continuation of U.S. application Ser. No. 12/496,193 (now U.S. Pat. No. 7,809,297), filed on Jul. 1, 2009, which is a continuation of U.S. application Ser. No. 12/039,432 (now U.S. Pat. No. 7,574,156), filed on Feb. 28, 2008, which is a continuation of U.S. application Ser. No. 11/408,027 (now U.S. Pat. No. 7,362,983), filed Apr. 21, 2006, which is a continuation of U.S. application Ser. No. 10/765,143 (now U.S. Pat. No. 7,058,332), filed Jan. 28, 2004, and under 35 U.S.C. § 119 from Japanese Application Nos. 2003-019721, filed on Jan. 29, 2003, and 2004-012904 filed on Jan. 21, 2004, the entire contents of each are hereby incorporated herein by reference.

BACKGROUND OF THE INVENTION

Field of the Invention

The present invention relates to an image forming apparatus. More particularly, the present invention relates to an image forming apparatus having an authentication capability.

Description of the Related Art

Conventional image forming apparatuses such as a printer, copier and the like generally have a use restriction mode. In the use restriction mode, a user inputs the user code in the image forming apparatus, and the image forming apparatus authenticates the user and allows the user to use the image forming apparatus if the user is authenticated. In addition, the use restriction mode is also provided in an image forming apparatus that includes functions of a copier, a printer, a facsimile, a scanner and the like in a cabinet.

In addition, a method is widely used in which a key card, a prepaid card, a coin lack, a card reader or the like is connected to the image forming apparatus, so that the image forming apparatus releases use restriction when a card is set or a coin is thrown in and the image forming apparatus can perform billing management.

There are various objectives for performing the use restriction according to activities of corporate sections and the users. Thus, it is required to quickly provide an image forming apparatus that includes functions for performing use restriction and billing management suitable for user's objectives.

However, the conventional authentication method is realized by providing an authentication capability in system software that is unchangeably provided in the image forming apparatus. Thus, it is difficult to quickly customize an authentication capability in the image forming apparatus in response to a user's demand.

In addition, depending on change of the objective of the use restriction or the billing management, there may be a case where the method of the use restriction or the billing management should be changed. Thus, it is required to change the method of the use restriction or the billing management quickly. However, by adopting the authentication capability that is embedded in the system software, it is difficult to change the authentication capability that is only a part of the system software since the change may affect largely other functions that should not be changed in the system software.

SUMMARY OF THE INVENTION

An object of the present invention is to provide an image forming apparatus and an authentication method that enable the user to easily add or change an authentication function according to various objectives.

The object can be achieved by an image forming apparatus including applications and system side software for providing system side services to the applications, the image forming apparatus including:

an authentication module for displaying an authentication screen on an operation panel of the image forming apparatus, wherein the authentication module allows the image forming apparatus to display a screen for using the image forming apparatus instead of the authentication screen if authentication data input from the authentication screen satisfies an authentication condition, wherein the authentication module is provided in the image forming apparatus separately from the system side software.

According to the present invention, it is not allowed to change the authentication screen into an screen for using the image forming apparatus unless the authentication condition is satisfied. Thus, by appropriately setting the authentication screen and the authentication condition, use restriction suitable for various objectives can be performed. In addition, since the authentication module is provided separately from the system side software that is unchangeably provided in a ROM and the like, the authentication module can be easily added or changed.

BRIEF DESCRIPTION OF THE DRAWINGS

Other objects, features and advantages of the present invention will become more apparent from the following detailed description when read in conjunction with the accompanying drawings, in which:

FIGS. 8A and 8B show information examples in the application setting file;

DETAILED DESCRIPTION OF THE PREFERRED EMBODIMENTS

First Embodiment

In the following, an outline of the first embodiment of the present invention is described with reference to FIGS. 1 and 2.

The image forming apparatus (referred to as a compound machine hereinafter) of the present embodiment includes hardware resources and applications. The hardware resources include a display part, a print part, an image pickup part and the like that are used for image formation. The applications include a print application, a copy application, a facsimile application and the like. In addition, the compound machine is provided with various control services between the applications and the hardware resources. The control services manages the hardware resources, and performs execution control and image formation processes. Compared with conventional compound machines, an application can be added easily in the compound machine of this embodiment. Therefore, as to the compound machine of this embodiment, by developing a new application suitable for user's needs, the new application can be easily added to the compound machine that is operating at a user's site.

Figure 1:
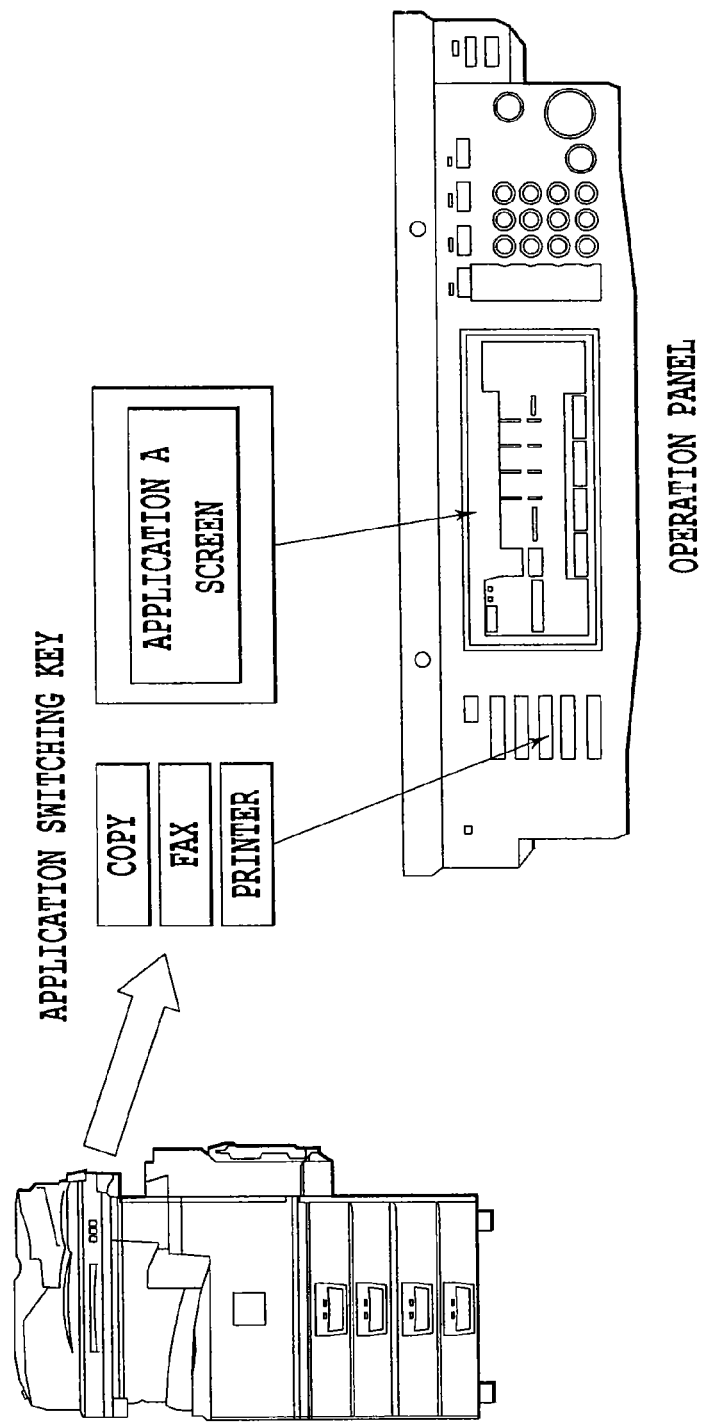
FIG. 1 shows an external view of the compound machine and the operation panel.

The compound machine has an operation part (referred to as an operation panel hereinafter) as shown in FIG. 1 that is commonly used for each application. An application can be switched to another application by pushing an application switching key on the operation panel.

The compound machine of this embodiment includes an authentication module of the present invention. The authentication module is provided in the compound machine separately from the authentication capability that is unchangeably provided in the system side. When a screen of the authentication module is displayed on the operation panel, the screen cannot be changed to a screen of another application unless the authentication condition is satisfied. Information for realizing authentication used by the authentication module can be provided in the compound machine. Alternatively, the information can be provided in an external authentication/billing server, so that the compound machine requests the authentication/billing server to perform authentication.

In addition, accordion to the compound machine of this embodiment, the authentication module can be set as "priority application". The priority application is an application that has a screen control right when the application is launched. That is, when the priority application is launched in response to power on or system reset of the compound machine, the screen of the priority application is displayed first on the operation panel. Thus, by setting the authentication application as "priority application", use of a desired application is restricted unless an authentication condition is satisfied. In addition to applications, a software module in the system side can be set as the priority application. That is, the "priority application" in this specification may include an application and system side software.

Figure 2:
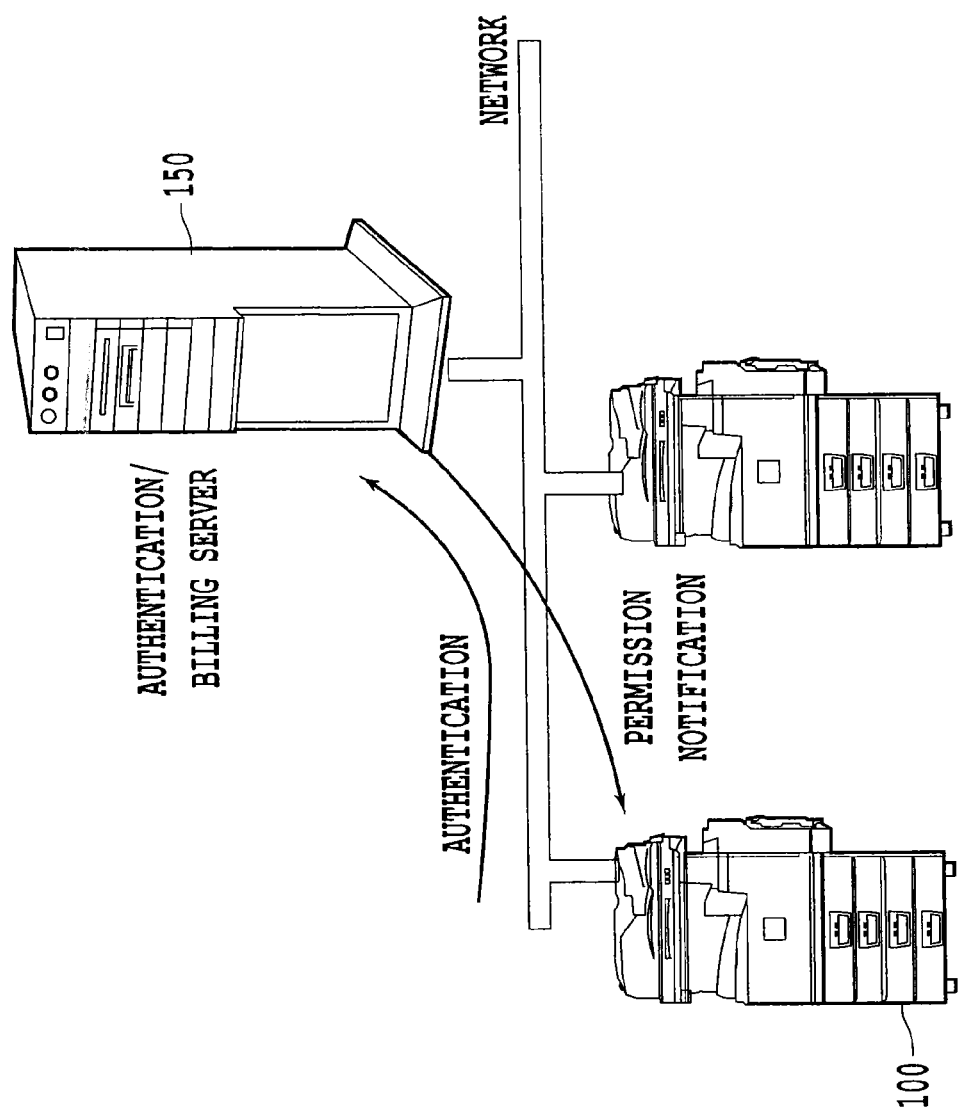
FIG. 2 shows a configuration in the case where the authentication/billing server 150 and the compound machine 100 are connected via a network.

FIG. 2 shows a configuration in the case where the authentication/billing server is used. In the configuration shown in FIG. 2, the compound machine 100 and the authentication/billing server 150 are connected via a network.

An outline of the operation of the compound machine in the configuration of FIG. 2 is described in the following.

When the authentication module launches as the priority application, a screen is displayed on the operation panel to prompt for "user code" and "password" that are used for user authentication. When the authentication data is obtained from a card by using a card reader in the compound machine, a message such as "insert a card" is displayed on the operation panel.

In the following, a case where only a user code is used is described. First, a user who wants to use the compound machine 100 inputs the user code from the screen displayed on the operation panel. When the compound machine 100 receives the user code, the compound machine 100 sends the user code to the authentication/billing server 150. The authentication/billing server 150 checks whether there is data that is the same as the received user code. If there is the data, the server 150 returns a message indicating that the authentication succeeds to the compound machine 100. The authentication module displays a message such as "please select an application key" on the operation panel and enables the application switching keys.

If the user pushes a copy key, a screen of the copy application is displayed so that the user can copy a document. After copy operation ends and after a time (time setting: idle state 30 seconds for example) elapses, "system auto clear" is initiated. Then, the screen of the authentication module is displayed and the mode is changed to the use restriction mode again.

Next, the first embodiment of the present invention is described in detail.

Figure 3:
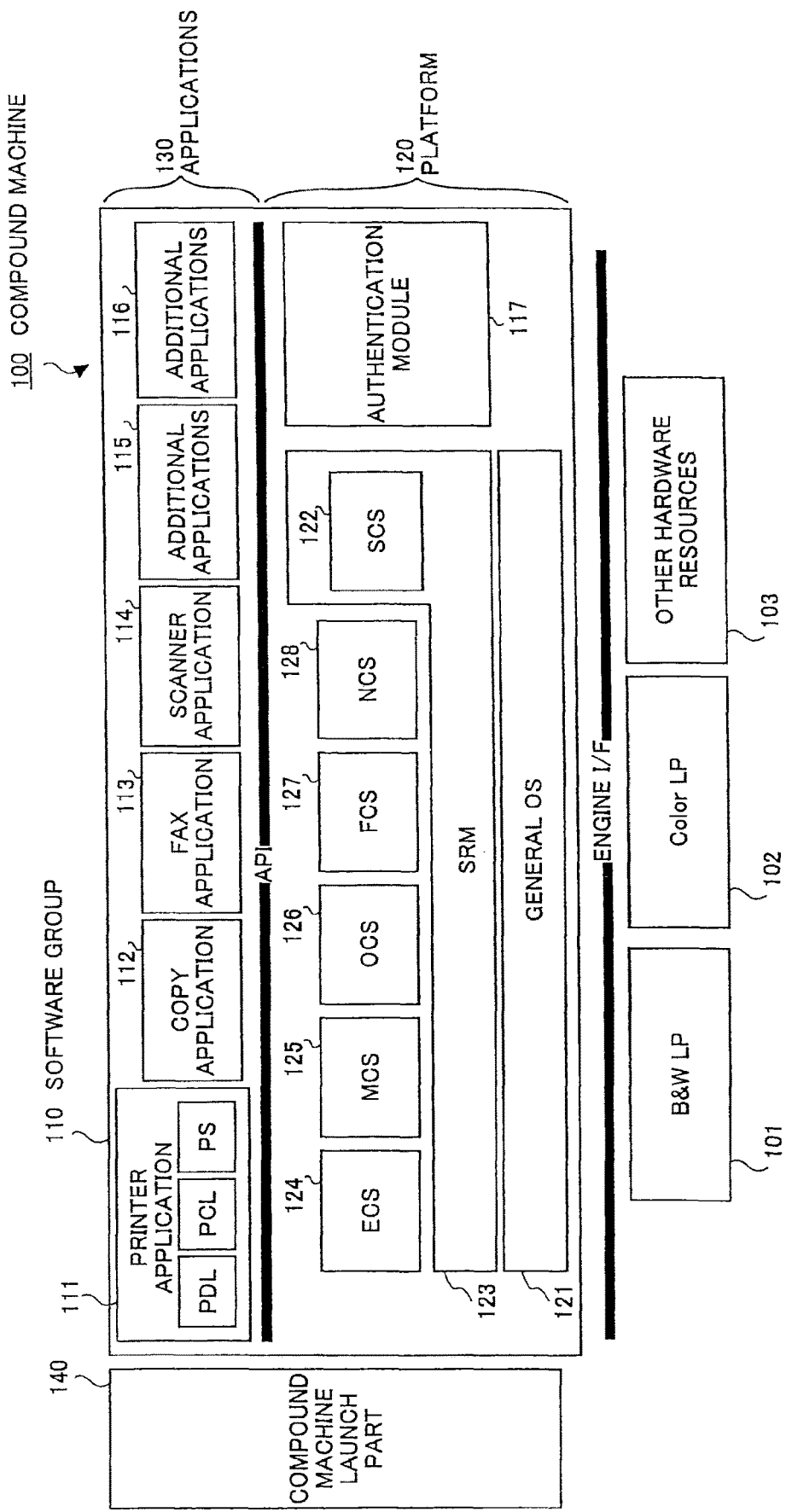
FIG. 3 is a block diagram of the compound machine according to the first embodiment of the present invention.

FIG. 3 is a block diagram of the compound machine according to the first embodiment of the present invention. As shown in the figure, the compound machine 100 includes hardware resources 103, a software group 110 and a compound machine launching part 140. The hardware resources 103 include a black and white line printer (B&W LP) 101, a color line printer 102, and a scanner, a facsimile and the like. The software group 110 includes a platform 120 and applications 130. The compound machine launching part 140 is executed first when the compound machine is turned on. The compound machine launch part 140 initializes and diagnoses the machine, and launches each control service and each application.

The platform 120 includes control services for interpreting a processing request from an application to issue an acquiring request for hardware resources, a system resource manager (SRM) 123 for managing one or more hardware resources and arbitrating acquiring requests from the control services, and a general-purpose OS 121.

The control services include a plurality of service modules including a system control service (SCS) 122, an engine control service (ECS) 124, a memory control service (MCS) 125, an operation panel control service (OCS) 126, a fax control service (FCS) 127, and a network control service (NCS) 128. In addition, the platform 120 has application program interfaces (API) that can receive process requests from the applications 130 by using predetermined functions.

The general purpose OS 121 is a general purpose operating system such as UNIX. The process of the SRM 123 is for performing control of the system and performing management of resources with the SCS 122. The process of the SCS 122 performs application management, control of operation parts, display of system screen, LED display, resource management, and interrupt application control. The process of the ECS 124 controls engines of the hardware resources. The SCS 122 includes a function of user authentication in addition to the above-mentioned functions. For example, the SCS 122 has an authentication function for allowing the use of the compound machine if a user code and a password input by the user are the same as those registered in the compound machine.

The process of the MCS 125 performs processes on an image memory and a hard disk apparatus (HDD). The process of the FCS 127 performs processes for sending and receiving facsimile. The NCS 128 is a process for providing services commonly used for applications that need network I/O. The NCS 128 includes functions for protocol processing for realizing data communications.

The OCS 126 controls the operation panel that is a means for transferring information between the operator (user) and control parts of the machine. In the compound machine 100 of the embodiment, the OCS 126 includes an OCS process part and an OCS function library part. The OCS process part obtains an key event, which indicates that the key is pushed, from the operation panel, and sends a key event function corresponding to the key event to the SCS 122. The OCS function library registers drawing functions and other functions for controlling the operation panel, in which the drawing functions are used for outputting various images on the operation panel on the basis of a request from an application or from the control service.

The applications 130 include a printer application 111 that is an application for printing, a copy application 112, a fax application 113 that is an application for facsimile, a scanner application 114 that is an application for a scanner. In addition, the compound machine 100 may include additional applications 115 and 116 that are added to the compound machine as necessary. The additional application can be installed (loaded) into the compound machine 100 from a flash card or a SD card and the like as necessary. In addition, the additional application can be launched from the flash card or the SD card. Further, the additional application can be installed or launched from a sever via a network.

Further, the compound machine 100 includes the authentication module 117 of the present invention. In the same way as the additional application, the authentication module 117 can be easily added to the compound machine from the flash card, SD card and a server connected to a network. When a function of the authentication module is changed, a new authentication module can be installed easily. The authentication module can be provided in either of the control service side (FIG. 3) and the application side (FIG. 4).

Each process of the applications and each process of the control services perform processes while performing inter-process communication by using function calls and by sending return values, and by exchanging messages. The control services provide common services to the applications 130. The control services can be called system side software, and a service provided by the control service to an application can be called a system side service.

Figure 4:
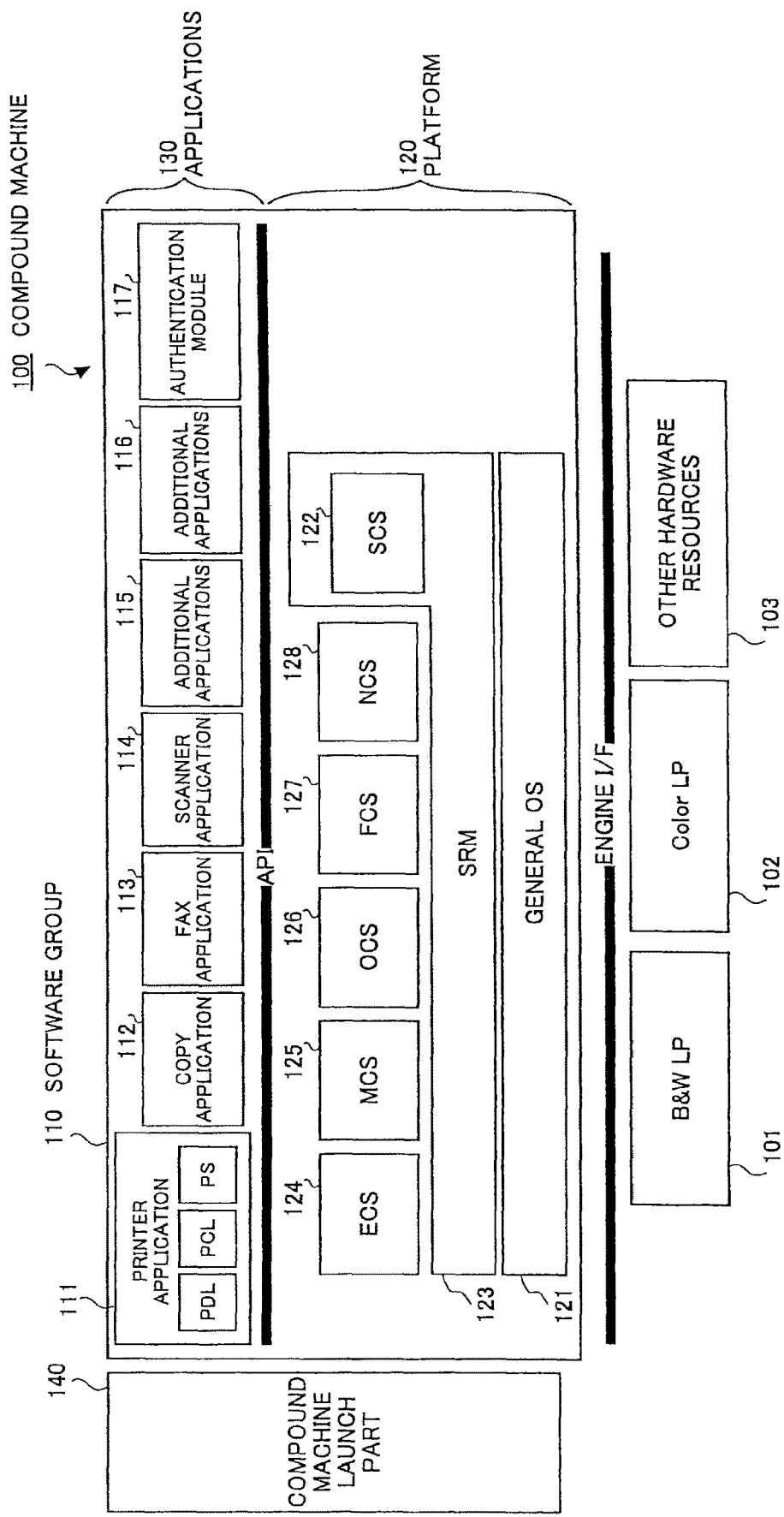
FIG. 4 is a block diagram of the compound machine according to the first embodiment of the present invention.
Figure 5:
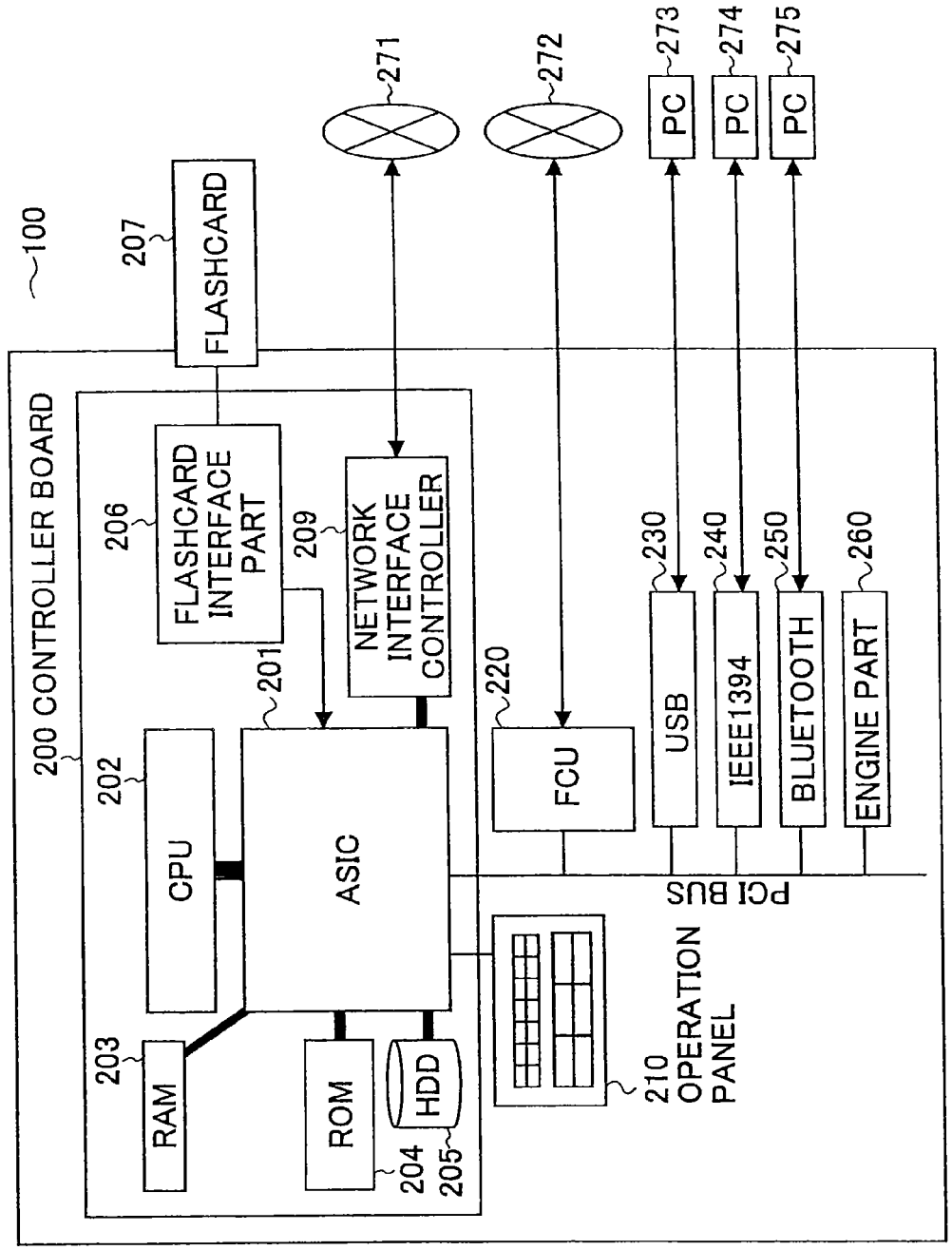
FIG. 5 shows a hardware configuration of the compound machine 100 shown in FIGS. 3 and 4 according to the first embodiment.

FIG. 5 shows a hardware configuration of the compound machine 100 shown in FIGS. 3 and 4 according to the first embodiment. As shown in FIG. 5, the compound machine 100 includes a controller board 200, an operation panel 210, a fax control unit (FCU) 220, a USB device 230, an IEEE1394 device 240, a Bluetooth device 250 and an engine part 260. The controller board 200 includes ASIC 201, a CPU 202, a RAM 203, a ROM 204, a HDD 205, a flash card interface part 206 and a network interface controller 209. The operation panel 210 is directly connected to the ASIC 201. The FCU 220, the USB device 230, the IEEE1394 device 240 and the Bluetooth device 250 and the engine part 260 are connected to the ASIC 201 via the PCI bus.

The network interface controller 209 communicates with other devices connected to the network 271 by using MAC addresses. The FCU 220 is connected to a telephone network 272. By using the USB device 230, the IEEE1394 device 240 and the Bluetooth device 250, the compound machine 100 can connect to other terminals 273-275. The terminals 273-275 may be a personal computer, PDA, a cellular phone and the like. The flashcard interface part 206 is an interface for exchanging data with a flashcard 207 that is inserted into the flashcard interface part 206. The compound machine 100 may have a SD card interface part.

The ROM 204 stores the applications, programs of the control services and the SRM 123.

According to the present embodiment, the authentication module 117 is launched directly from the flashcard 207. Alternatively, the authentication module 117 can be installed into the HDD 205 from the flashcard and can be launched from the HDD 205. The applications such as the printer application 111, copy application 112, scanner application 114 and control services are embedded in the ROM 204 when the compound machine 100 is shipped. The applications and the control services are launched by the compound machine launch part 140 when the compound machine 100 is turned on. Since the authentication function of the SCS 122 is embedded in the ROM 204, it is difficult to change the authentication function. On the other hand, since the authentication module 117 can be launched from the flashcard or the SD card as necessary, the authentication module 117 can be easily added or changed.

Next, the operation of the compound machine 100 in this embodiment will be described in detail.

Figure 6:
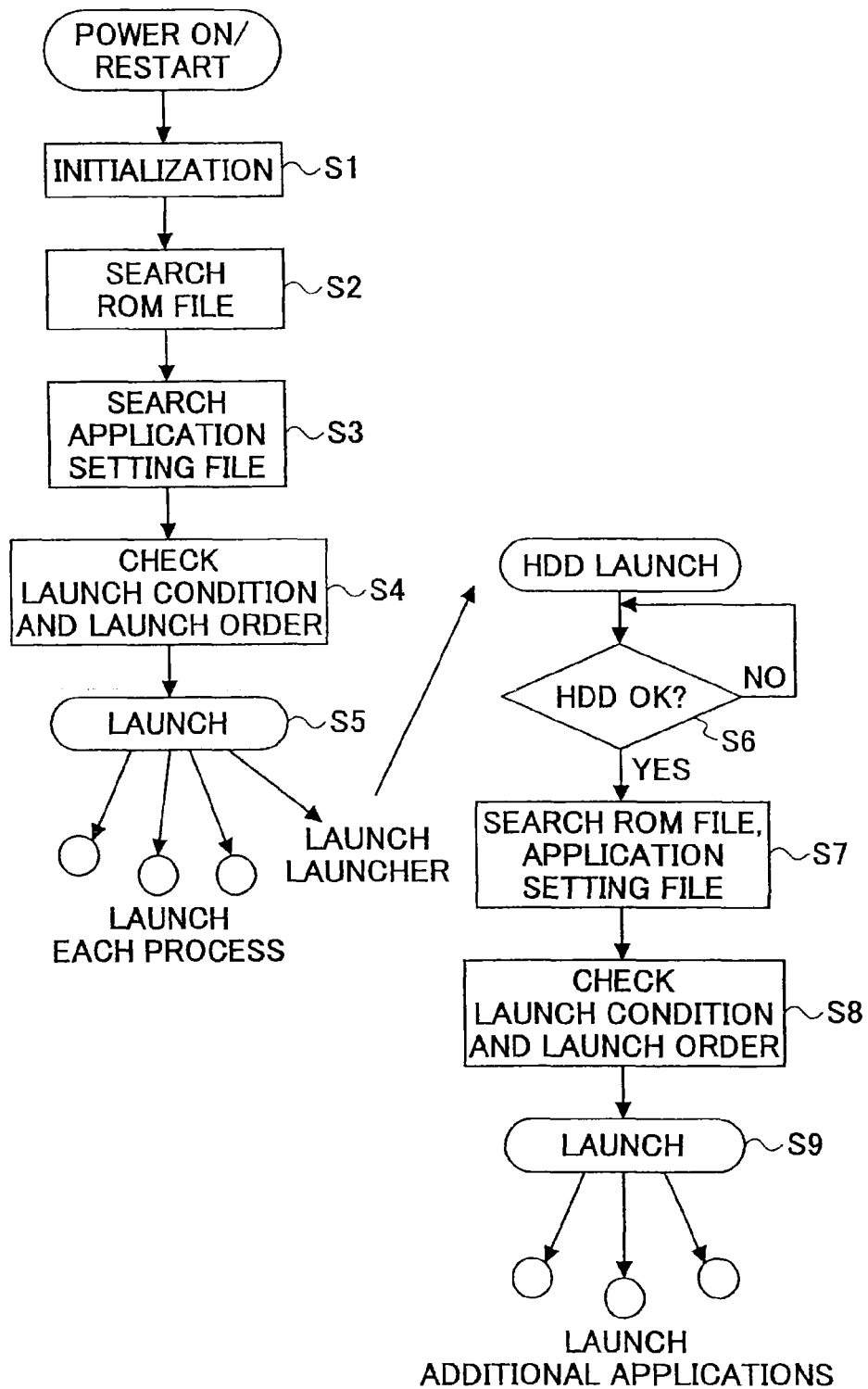
FIG. 6 is a flowchart showing the operation of the compound machine 100 when the compound machine 100 is launched.

FIG. 6 is a flowchart showing the operation of the compound machine when the compound machine is launched. This process is performed by the compound machine launch part 140.

At the time when the compound machine is turned on or the compound machine is reset, initializing process is performed in step S1. The initializing process includes launch of BIOS (Basic Input/Output System) and launch of boot loader, launch of kernel, initialization and diagnosis of hardware and the like.

Figure 7:
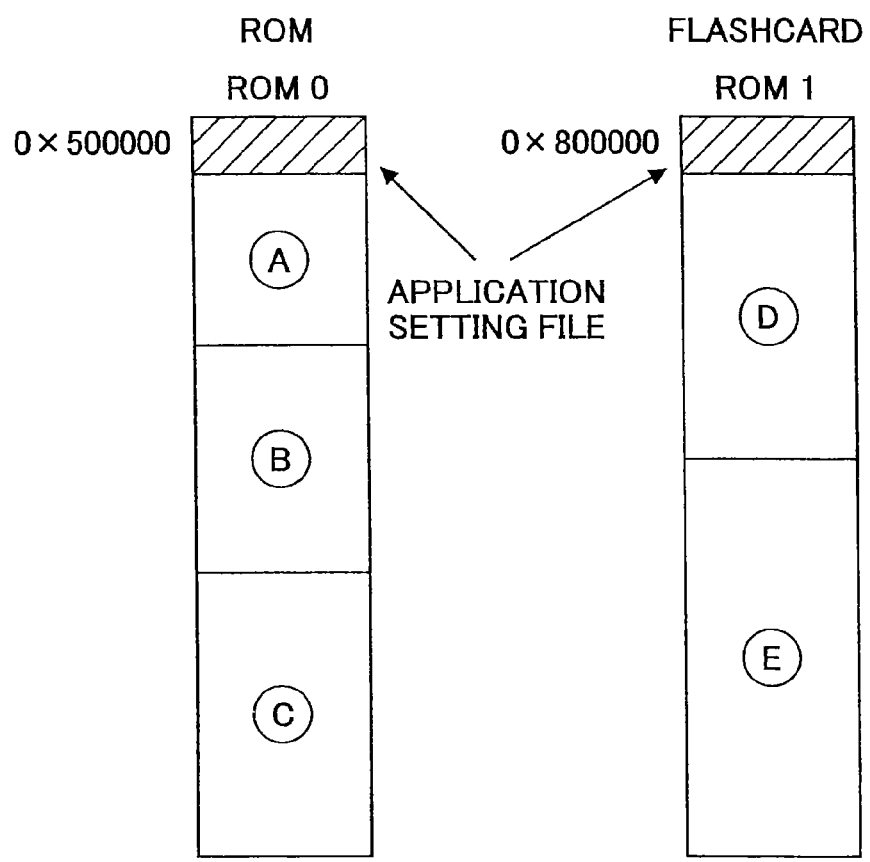
FIG. 7 is for explaining the application setting file.

Next, the compound machine 100 searches the ROM file (romfs file) in a memory medium such as the ROM and the like for an application setting file that is located at a predetermined position in the memory medium in step S2, and the compound machine 100 searches the application setting file in step S3. For example, as shown in FIG. 7, ROM files (ROM0 and ROM1) are stored in the ROM and the flashcard, in which the application setting file exists in each head. FIG. 8A shows an example of the application setting file in the ROM, and FIG. 8B shows an example of the application setting file in the flashcard. In FIGS. 8A and 8B, "−2" and the like indicates launch priority.

Next, the compound machine 100 refers to the application setting file in the ROM, and mounts the ROM file system (romfs) according to a mount command. Then, the compound machine 100 checks launch condition and launch order of applications by referring to the application setting files including one in the flashcard (FIG. 8B) in step S4, then, launches applications and control services including the SCS 122 in step S5. In the example shown in FIGS. 7, 8A and 8B, applications are launched in an order A→C→B→D→E.

In the case where an application is also stored in the hard disk (HDD205), a launcher for launching the application in the hard disk is launched. The launcher launches the hard disk and waits for completion of preparation of the hard disk in step S6. After that, a ROM file and an application setting file are searched. According to the application setting file, the application is launched in steps S7-S9.

Figure 9:
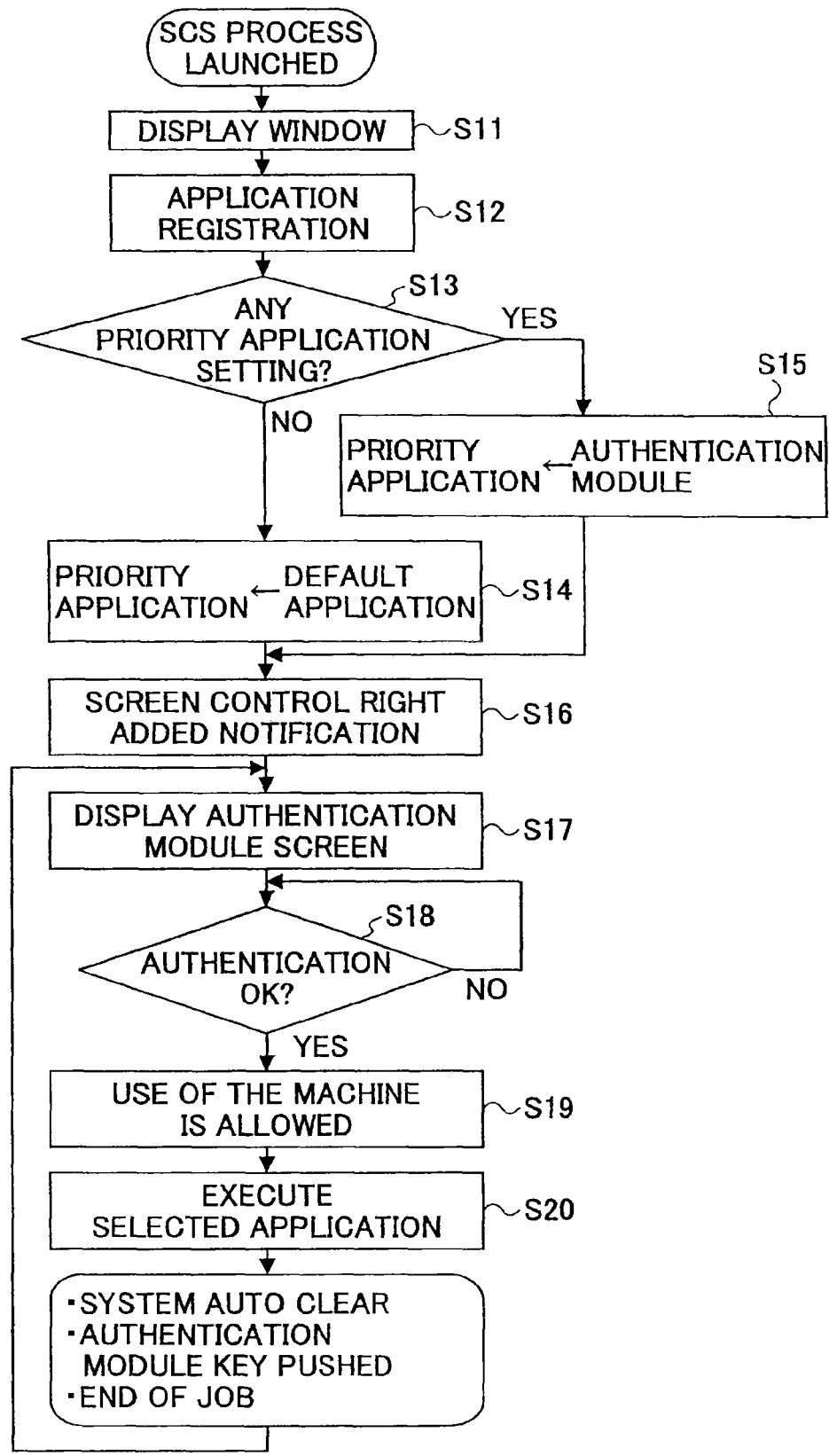
FIG. 9 is a flowchart showing the operation of the compound machine 100 after the SCS 122 that is one of the control services is launched.

FIG. 9 is a flowchart showing the operation of the compound machine 100 after the SCS 122 that is one of the control services is launched.

When the SCS process is launched according to the application setting file, a window is displayed on the operation panel 210 in step S11 and a message such as "please wait" is shown. During the time, application registration is performed for each launched application (copy, printer and the like) in step S12. The SCS 122 receives application registration request messages from each application, and stores ID of each application in a RAM and the like, so that the application registration is performed.

Next, the compound machine 100 checks whether there is any priority application by referring to a predetermined region (referred to as "priority application region" hereinafter) in a storage such as RAM 203 in step S13. If there is no setting of the priority application in the priority application region in the storage, a default application (copy application in usual) is set as a priority application in step S14. If the authentication module is set as the priority application, the authentication module becomes the priority application in step S15.

To set an application in a priority application region as a priority application means to provide the application with authority (right) to access the operation panel, that is, to set an application in a priority application region as a priority application means to provide screen control right to the application. In the following, a case where the authentication module 117 is set as the priority application is described. If the authentication module 117 is set as the priority application, the SCS 122 sends a notification message to the authentication module 117 to notify that the screen control right is provided to the authentication module 117 in step S16.

Next, when the authentication module 117 receives the notification message from the SCS 122, the authentication module 117 displays a user authentication screen on the operation panel 210 in step S17. More specifically, the screen is displayed on the operation panel 210 by the OCS 126 in response to receiving a display request from the authentication module 117. That is, the authentication module 117 specifies drawing information for the OCS 126. That is, the authentication module 117 specifies drawing information and calls drawing functions, so that the OCS 126 performs processes for displaying the designated drawing information.

If the data input from the user authentication screen satisfies an authentication condition (Y in step S18), a message prompting for selection of an application is displayed on the operation panel with a message showing permission to use the compound machine 100 in step S19. In the above-mentioned processes, the operations such as key input, button push and the like from the operation panel 210 are sent to the authentication module via the OCS 126 and the SCS 122.

When a user selects an application from the operation panel 210, the selected application is notified to the SCS 122. The SCS 122 changes setting of priority application to the selected application. Then, the SCS 122 sends a message to the selected application to notify that the screen control right is provided to the selected application. After that, the selected application is executed in step S20.

While the application is executed, at an occasion such as system auto clear, push of authentication module key, and end of job of the application, the screen control right is moved to the authentication module and the authentication module displays an authentication screen.

Figure 10:
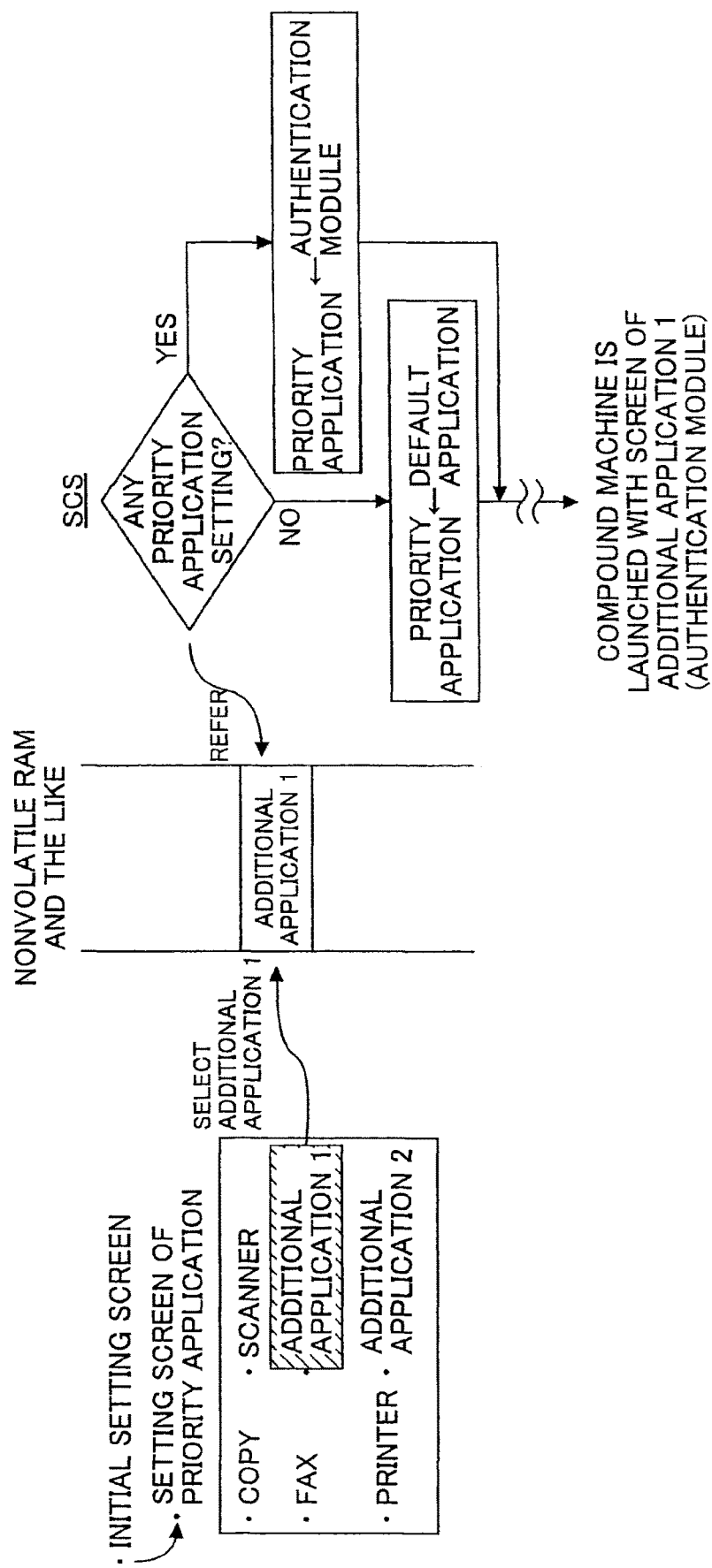
FIG. 10 is for explaining setting of the priority application.

In the above-mentioned example, the authentication module 117 is initially set as a priority application. For setting the authentication module 117 as a priority application, the user selects "priority application setting" from the initial setting screen of the compound machine. Then, as shown in FIG. 10, a priority application setting screen including the added applications (authentication module and the like) are displayed. Then, the user selects a desired added application from the screen. Accordingly, the name of the selected application is registered in the priority application region. When the compound machine is launched, the SCS 122 refers to the information to determine presence or absence of priority application setting. In this way, it becomes possible to make the authentication module to display an authentication screen at the time when the compound machine launches.

Figure 11:
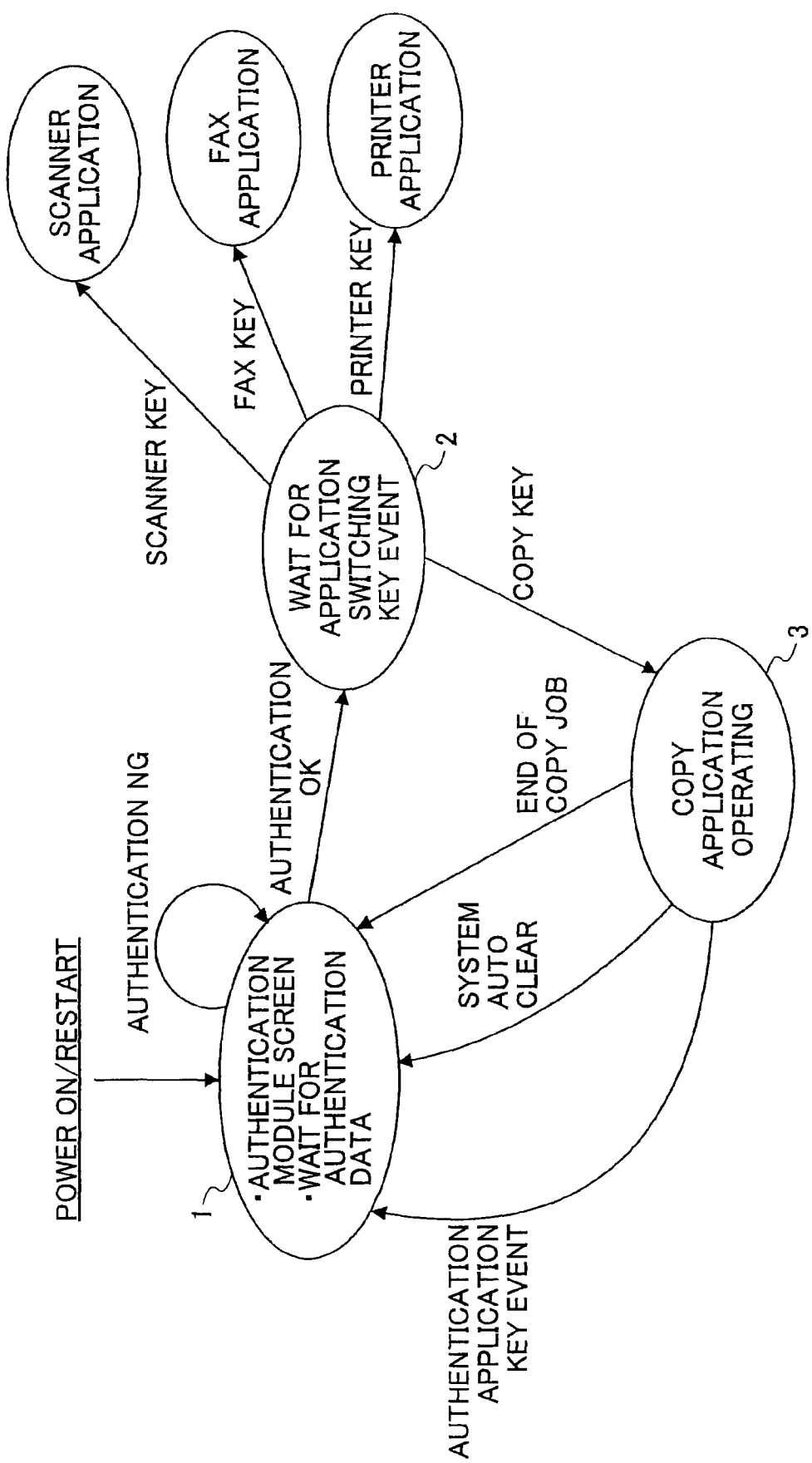
FIG. 11 shows screen state transition on the operation panel 210 according to the first embodiment.

In the above-mentioned process, transition of the state of the screen on the operation panel 210 is shown in FIG. 11 taking copy application as an example.

As shown in FIG. 11, in response to power on or restart, the authentication module screen is displayed and the compound machine enters a state (state 1) of waiting for authentication condition input. If an input by a user does not satisfy the authentication condition, the authentication screen does not change to another screen. If an input by the user satisfies the authentication condition (authentication OK), the compound machine displays an application selection screen and enters a state (state 2) of waiting for an application change key event. Then, the compound machine receives an input indicating the selected application, so that the screen changes to a screen of the application.

For example, when a copy application is selected, a screen for copying is displayed, and the compound machine enters a copy available state (state 3). While the copy application is operating, the screen returns to the authentication screen in response to an end of a job, system auto clear, detection of key event to return to the authentication module or the like.

Figure 12:
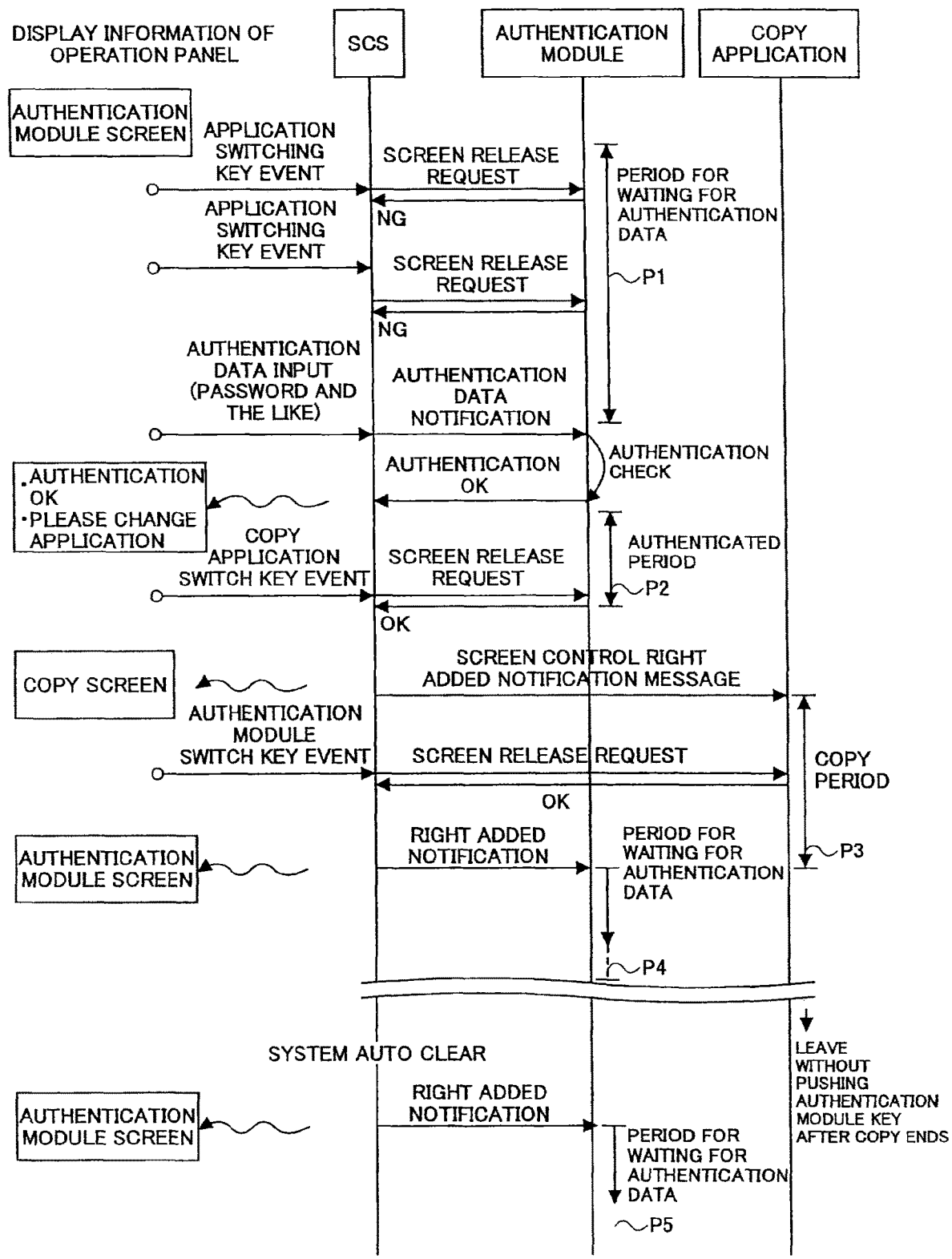
FIG. 12 is a sequence chart for explaining the operation of the authentication module according to the first embodiment.

FIG. 12 is a sequence chart for explaining the operation of the authentication module 117. In the left side, screen information of the operation panel 210 corresponding to the operation is shown. Display on the operation panel 210 and data input from the operation panel 210 are performed via the OCS 126. However, FIG. 12 does not show the OCS 126, but the SCS 122, the authentication module 117, and the copy application 112 are shown.

In the figure, the authentication module screen (can be also referred to as "authentication screen") is shown first, and the state is the authentication condition input waiting state (authentication condition input waiting period P1). In this state, if the application switching key event is sent to the SCS 122 and if the SCS 122 sends a screen release request to the authentication module 117, the authentication module 117 does not accept the request but returns NG to the SCS 122. That is, in the authentication condition input waiting period P1, the authentication module 117 returns NG for the screen release request and does not accept screen release unless there is an input that satisfies the authentication condition.

When authentication information such as a user code and a password is input from the operation panel 210, the SCS 122 notifies the authentication module 117 of the authentication information, so that the authentication module 117 checks if the authentication information is valid. If the authentication succeeds, it is notified to the SCS 122 (authentication check).

In the authenticated period P2, the authentication module 117 displays an application switching screen. The application switching screen may be displayed by the SCS 122. On the application switching screen, if the copy application 122 is selected, a copy application switching key event is sent to the SCS 122, and the SCS 122 sends a screen release request to the authentication module 117. Since the user has been authenticated, the authentication module 117 sends a screen release OK to the SCS 122.

The SCS 122 sets the copy application in the priority application region, and sends a message to the copy application to notify that the screen control right is provided to the application. Then, the copy application 112 displays a copy screen. After that, in a copy use period P3, the copy application is used. While the copy application is used, if the authentication module 117 is selected by pushing a key on the operation panel 210, an authentication module key event is sent to the SCS 122. When the SCS 122 sends a screen release request to the copy application, the copy application notifies the SCS 122 of a screen release OK. Then, the SCS 122 sets the authentication module 117 in the priority application region, and sends a message to the authentication module 117 to notify that the screen control right is provided. Then, the authentication module 117 displays the authentication module screen, and the compound machine enters an authentication condition input waiting state (authentication condition input waiting period P4). Since the compound machine can display the authentication module screen while copy application is operating, it can be prevented that other user uses the compound machine without permission when the authenticated user leaves the compound machine.

In the case where any authentication module key event is not issued while copying, if the compound machine 100 is left as it is for a while after the copy operation ends, the SCS 122 causes system auto clear so that the control right is changed to the authentication module 117. Then, the authentication module 117 displays the authentication module screen, so that the compound machine enters the authentication condition input waiting period P5.

After the copy operation completes, instead of using the authentication module 117, a use restriction capability of the SCS 122 can be used, in which user restriction can be performed by displaying a popup window showing "please insert a card" and the like.

As mentioned above, according to the first embodiment, use restriction of the compound machine 100 can be performed by using the authentication module 117. In the above example, although authentication is performed by comparing user codes and the like, the authentication condition is not limited to the above-mentioned example. The authentication condition can be determined appropriately according to usage and demand of the user, and the authentication screen applicable to authentication condition can be displayed. For example, authentication can be performed by using a company's proprietary employee card, or by using a fingerprint. Further, the authentication method is not limited to the above-mentioned example. For example, in addition to a method in which the compound machine 100 checks the authentication condition, a method can be adopted in which a remote authentication/billing server checks the authentication condition. By changing the authentication module 117 without changing other applications (copy, printer, FAX and the like), the authentication condition or the authentication method can be changed. Since it is unnecessary to change other applications, authentication functions of the compound machine 100 can be easily customized.

In addition, according to the present embodiment, a copy screen can be changed to the authentication module screen while copy operation is performed. Thus, even if a user leaves the compound machine 100 after instructing the compound machine 100 to copy a large number of documents, the screen can not be changed to other application screen unless authentication is performed again. Therefore, it can be prevented that other user uses the compound machine 100 invalidity. In addition, even when the user forgets to change the screen into the authentication screen before leaving the compound machine 100, it can be prevented that an invalid user uses the compound machine 100 since the authentication screen can be displayed in response to system auto clear after the copy ends.

Second Embodiment

Next, the second embodiment of the present invention is described. In the second embodiment, the number of copies is managed and the authentication module 117 counts the remaining number. That is, the authentication module 117 performs not only authentication but also a billing process.

Figure 13:
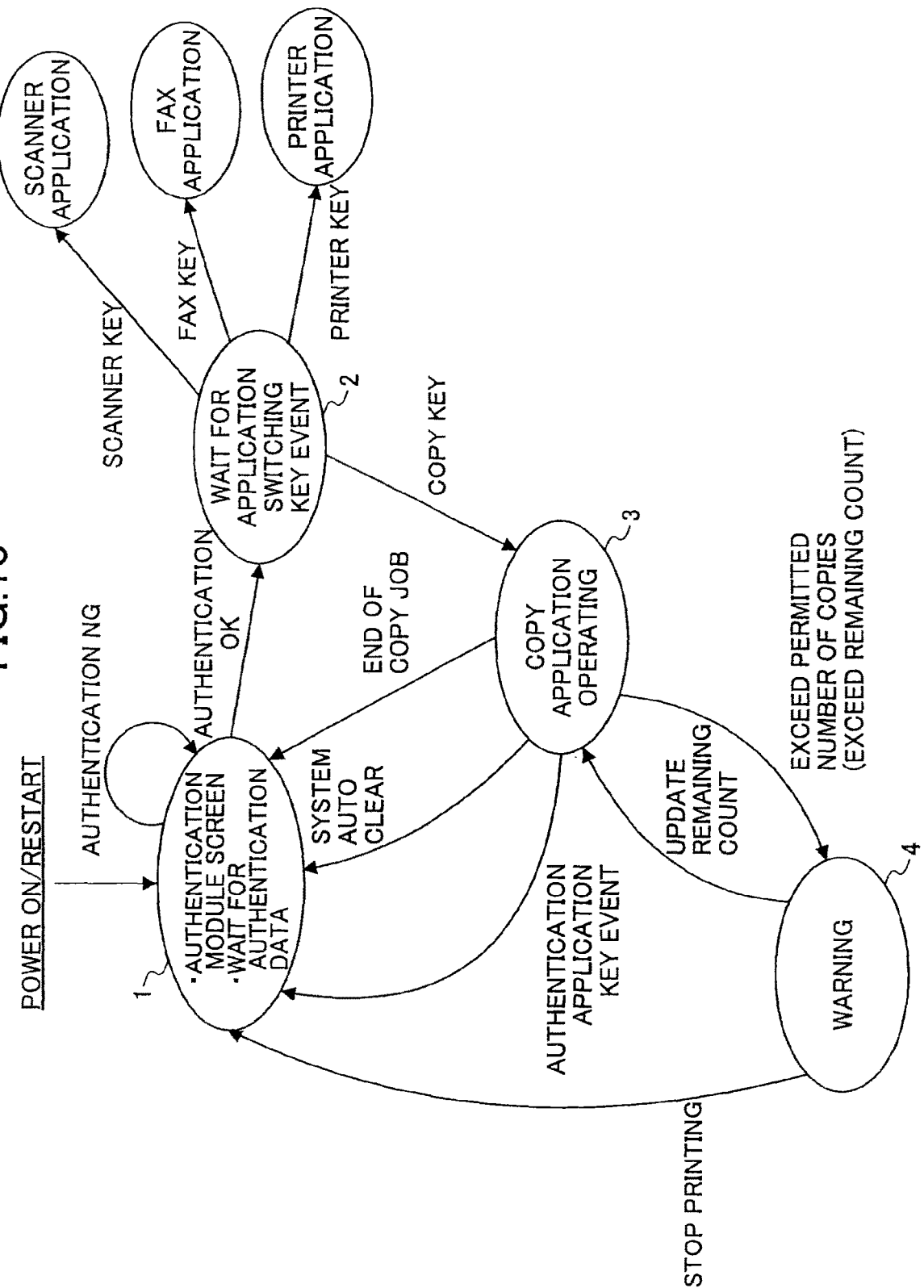
FIG. 13 shows screen state transitions in the second embodiment.

FIG. 13 shows screen transitions in the second embodiment. As shown in the figure, in the second embodiment, while the copy application is being used (state 3), if the number of copies exceeds a permissible number, the authentication module 117 displays a warning message (state 4). In this case, if the remaining number is updated, the screen is changed back to the copy screen. If the remaining number is not updated, the copy operation is stopped so that the screen is returned to the authentication screen.

Figure 14:
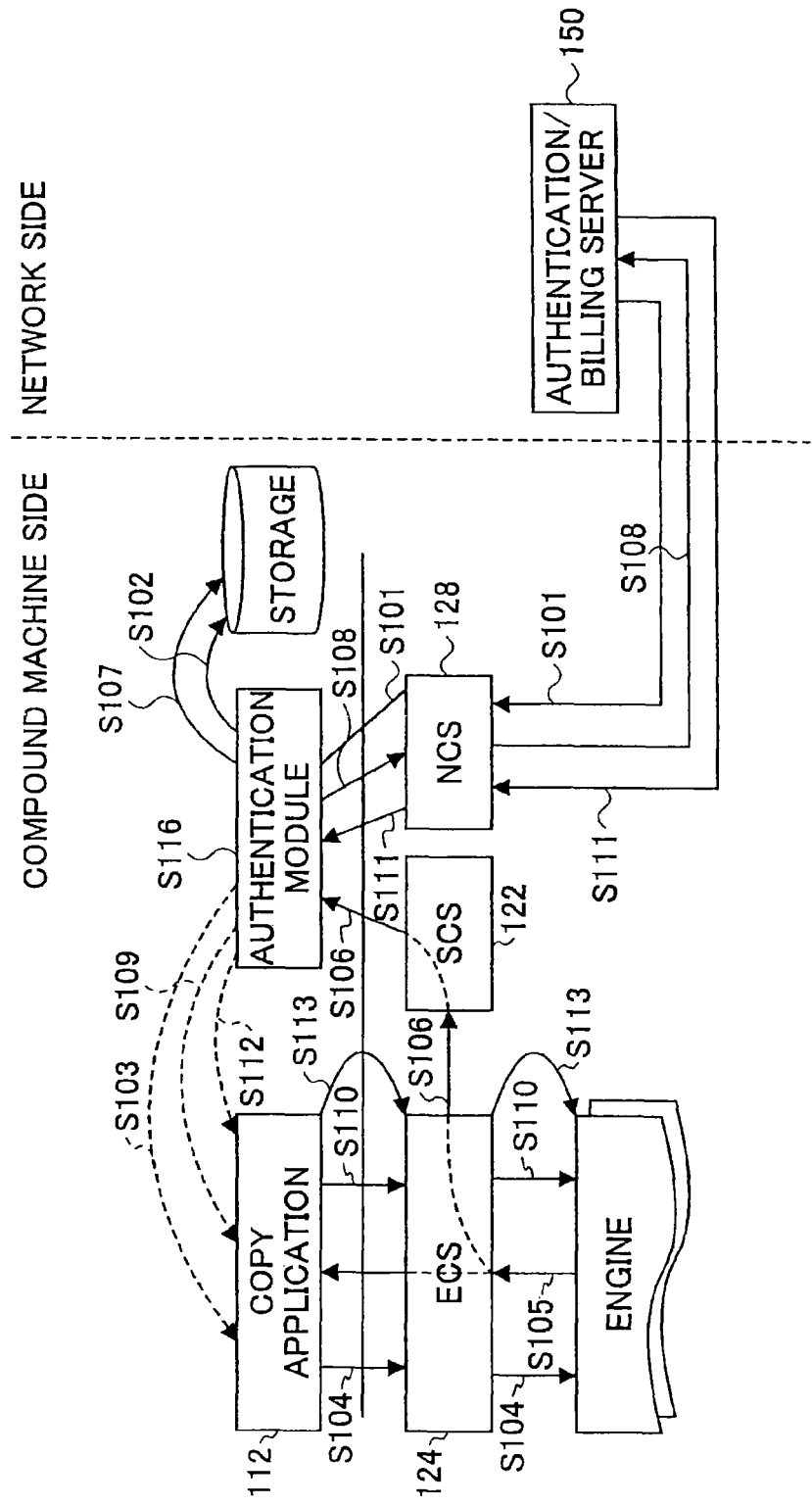
FIG. 14 shows a configuration in which the authentication/billing server 150 is connected to the compound machine 100 via a network according to the second embodiment.
Figure 15:
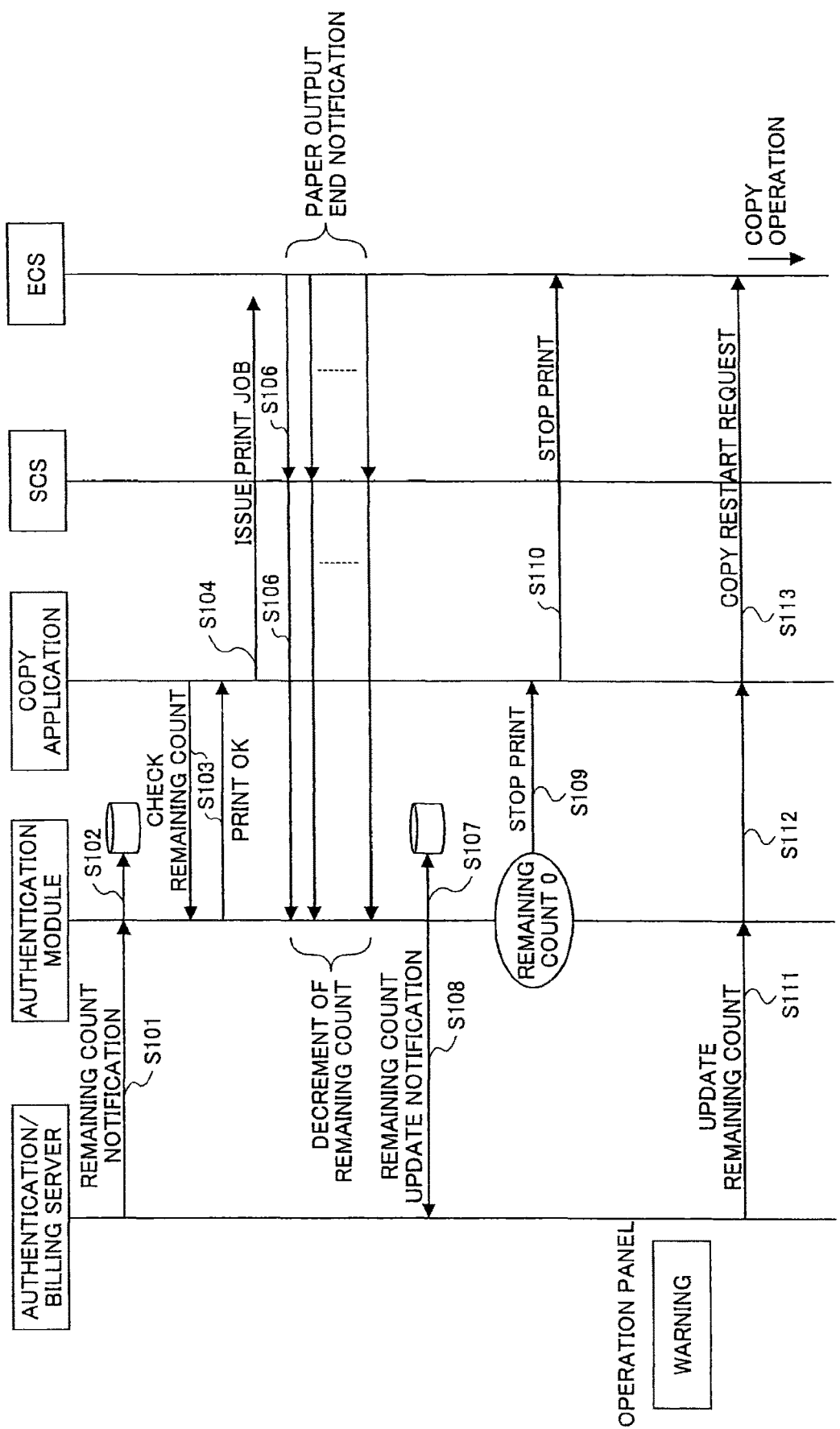
FIG. 15 is a sequence chart for explaining the operation of the compound machine 100 according to the second embodiment.

The operation of the compound machine 100 of the second embodiment is described with reference to the block diagram of FIG. 14 and the sequence chart of FIG. 15. FIG. 14 shows a configuration in which the authentication/billing server 150 is connected to the compound machine 100 via a network.

After the user inputs a user code and the like on the authentication module screen, the authentication/billing server 150 performs user authentication by comparing registered user code and the input user code. When the authentication is successful, an available number of copies (referred to as "remaining count") that can be made by the authenticated user is sent to the compound machine 100 in step S101.

The authentication module 117 receives the remaining count via the NCS 128 and stores the remaining count in a storage such as a nonvolatile RAM or a HDD in step S102. In a case when billing is performed for each user, the remaining count is obtained for each user, and remaining counts for each user can be stored in the storage. In addition, for example, in a case when billing is performed for each section, remaining counts for each section can be stored in the storage.

As described in the first embodiment, since the authentication is successful, an application selection instruction is displayed on the operation panel. When the user selects the copy application, the screen control right moves to the copy application 112, so that the copy screen is displayed.

The copy application 112 inquires the authentication module 117 whether the remaining count is larger than 0. If the remaining count is larger than 0, the authentication module 117 returns "print OK" in step S103. The inquiry can be performed via the SCS 122. Alternatively, the copy application 112 itself may check if there is any remaining count by referring to the storage.

When copying is started by the user, the copy application 112 sends a print job to the ECS 124 in step S104. The copy engine receives an instruction corresponding to the job from the ECS 124. Each time the copy engine makes a copy, the copy engine notifies the ECS 124 of an event indicating that printing completes in step S105. The event is sent to the authentication module 117 via the SCS 122 in step S106.

The authentication module 117 updates the remaining count by subtracting a number of copies that was made from the remaining count in step S107. Then, the authentication module 117 notifies the authentication/billing server 150 of the remaining count via the NCS 128 for each page or periodically in step S108.

When the remaining count becomes 0, the authentication module 117 instructs the copy application 112 to stop printing in step S109. This notification can be also performed via the SCS 122. After that, the copy application cancels the copy job and instructs the ECS 124 to stop printing in step S110. Then, the authentication module 117 displays a warning on the operation panel indicating there is no remaining count.

If the authentication server 150 updates the remaining count, a new remaining count is sent to the authentication module 117 in step S111, and the authentication module 117 notifies the copy application 112 that the remaining count is updated in step S112. Then, the copy application 112 requests the ECS 124 to restart copying in step S113. After that, copying is restarted.

When the remaining count becomes 0 while copying is performed, the SCS 122 also can perform the process to stop the copy operation. In this case, for example, the SCS 122 displays a popup window indicating "please insert a key card". Accordingly, the use of the copy application can be restricted unless a valid key card is inserted.

In the above-mentioned example, the authentication module 117 collects print completion notification so that the remaining count is managed. Alternatively, the authentication module 117 can be configured to collect information relating to a series of operations, printing, reading, FAX sending and the like that occur when an application is used in association with the user ID. Accordingly, log information indicating who uses what application and the usage can be managed, and billing can be performed according to the log information.

As mentioned above, according to the second embodiment, the authentication module 117 collects log information such as the print completion notification. Different from control services such as the SCS 122, the authentication module 117 can be easily added to the compound machine 100. Thus, it is easy to change the method of collecting the log information, so that a billing method suitable for the demand of the market can be flexibly adopted, and usage of the compound machine 100 can be obtained in various forms. For example, by collecting, for each user or each section, data such as paper sizes, print settings (double sided print, integrated print, staple and the like), number of copies, number of occurrences of paper jam and the like, the use status of the compound machine 100 can be grasped. In addition, by inputting information indicating who makes a copy of what kind of document, or who scans or faxes what kind of document, the compound machine 100 can collect the information so that use status of the compound machine 100 can be managed more concretely. The information can be easily collected by configuring the compound machine 100 such that a user can not be allowed to use the compound machine 100 unless the user inputs the information in addition to the user code and the password.

[Configuration of Authentication Module]

Figure 16:
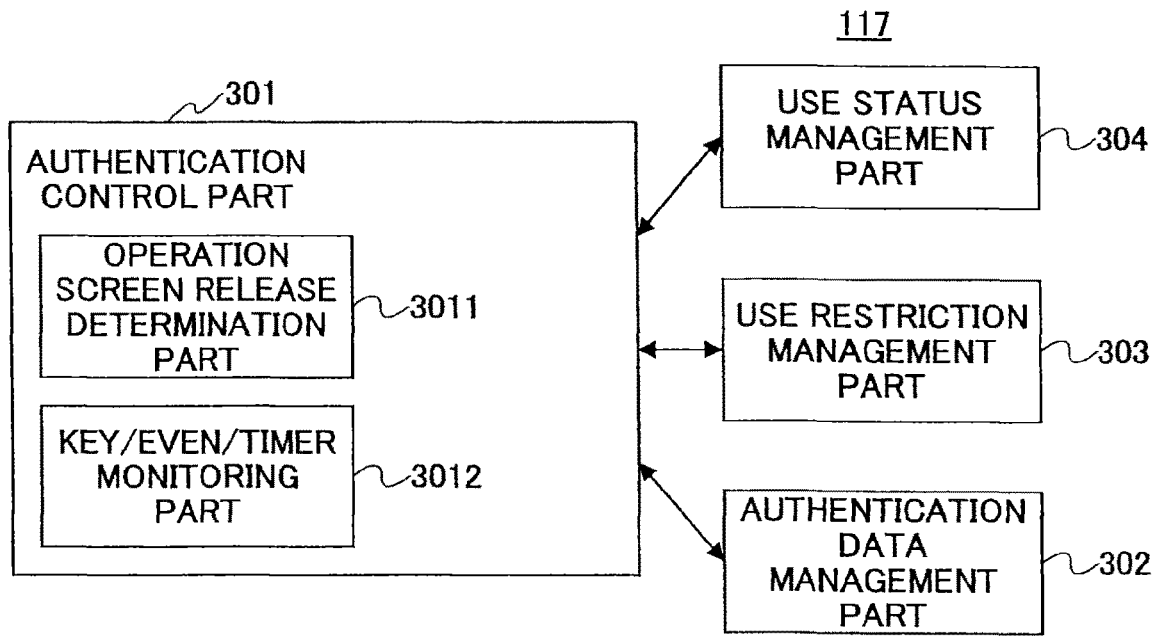
FIG. 16 shows an example of the configuration of the authentication module 117 that was described in the first and second embodiments.

FIG. 16 shows an example of the configuration of the authentication module 117 that was described in the first and second embodiments. As shown in FIG. 16, the authentication module 117 includes an authentication control part 301, an authentication data management part 302, a use restriction management part 303 and a use status management part 304. The authentication management part 301 includes an operation screen release determination part 3011 and a key/even/timer monitoring part 3012.

The authentication control part 301 has a function for displaying an authentication screen of the authentication module 117 after the compound machine 100 is turned on, the system is reset, or a job such as printing ends. The authentication control part 301 determines whether data (user code, for example) input from the authentication screen satisfies an authentication condition. For example, the authentication control part 301 compares an input user code and a registered user code, and determines that the authentication is successful if they are the same. An application that the user wants to use cannot be used unless the authentication is successful. The operation screen release determination part 3011 has a function to determine whether the authentication screen is released for another screen of an application according to the authentication result. The key/event/timer monitoring part 3012 has a function for monitoring input key, event and timeout of a timer.

The authentication control part 301 in the authentication module 117 can be added to the compound machine 100 from an IC card, SD card, or a sever via a network.

The authentication data management part 302 performs management of authentication data such as user codes and passwords and management of information systematically. In response to an inquiry from the authentication control part 301, the authentication data management part 302 obtains necessary data and returns the data to the authentication control part 301. In addition, the authentication data management part 302 may determine whether input data satisfies an authentication condition, and return the determination result to the authentication control part 301. Further, the authentication data management part 302 has an update/edit function for authentication data.

The use restriction management part 303 has a function for performing use restriction for each application for each user or for each group (section). For example, if a setting is made in which a specific section is allowed to use an specific application, the use restriction management part 303 compares a section name input via a use restriction screen displayed by the authentication control part 301 with the setting information, and determines whether the specific application can be used. In addition to the function of use restriction for each application, the use restriction management part 303 has a function to set an upper limit of usage (number of copies, for example) of a specific application for each user or for each section. When the usage reaches the upper limit, the use restriction management part 303 notifies the authentication control part 301 of it.

The use status management part 304 has a function to manage use status of an application for each authenticated user or group. For example, if the application is the copy application, the use status management part 304 manages the number of copies. If the application is an application using a network, the use status management part 304 manages logs which are destinations of transmitted data, for example.

Data managed by the above-mentioned management parts may be stored in the hard disk of the compound machine 100. In addition, instead of providing the management parts in the compound machine 100, the management parts can be provided in an external server connected via a network.

[Other Configuration Example of the Authentication Module]

As mentioned above, the authentication module 117 of the present invention can be added or changed easily compared with a conventional authentication capability (authentication capability in SCS 122 for example) in the system side. That is, the authentication module 117 can be changed according to demands of a user and the changed authentication module 117 can be installed in the compound machine 100 as necessary.

By implementing the authentication module 117 by using a Java program, the authentication module 117 can be downloaded from an external server and can be executed immediately. Therefore, the authentication module 117 can be added and changed more easily.

Figure 17:
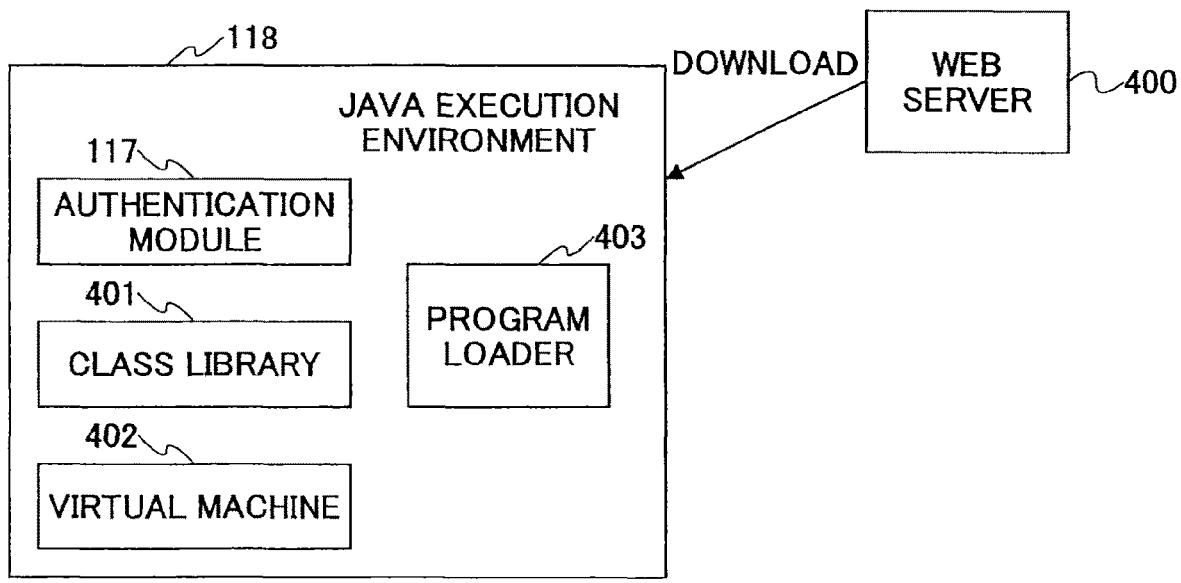
FIG. 17 shows a block diagram of an example of a Java execution environment 118 including the authentication module 117 (Java program)

FIG. 17 shows a block diagram of an example of a Java execution environment 118 including the authentication module 117 (Java program). The Java execution environment is located at the application layer in the configuration of the compound machine 100 shown in FIG. 3.

As shown in FIG. 17, the Java execution environment 118 includes the authentication module 117 that is a Java program, a class library 401, a virtual machine 402, and a program loader 403. FIG. 17 also shows a Web server 400 that provides Java programs. The compound machine 100 and the Web server 400 is connected via a network.

The class library 401 includes a class library necessary for executing the Java program and a class library for providing services for operating the compound machine 100. The virtual machine 402 interprets and executes the Java program. The program loader downloads the Java program from the Web server 400 and performs execution management. In the environment, a developed Java program is uploaded in the Web server 400 beforehand.

Then, the program loader 403 accesses the Web server 400 and downloads a Java program that the user wants, and executes the Java program.

Third Embodiment

Next, the third embodiment of the present invention is described. In the third embodiment, an authentication capability (included in SCS 122 for example) that is unchangeably included in the system side and the authentication module 117 are used by switching them. Hereinafter, the authentication capability in the system side is called "system side authentication control part". In the following, a mode in which authentication is performed by using the system side authentication control part is called "standard authentication mode", and a mode in which authentication is performed by using the authentication module 117 is called "additional authentication mode".

[Example Using an Authentication Screen Displayed by the System Side Authentication Control Part]

In the following, a case is described in which authentication is performed by the system side authentication control part or the authentication module 117 by using the authentication screen displayed by the system side authentication control part.

Figures 18, 19:
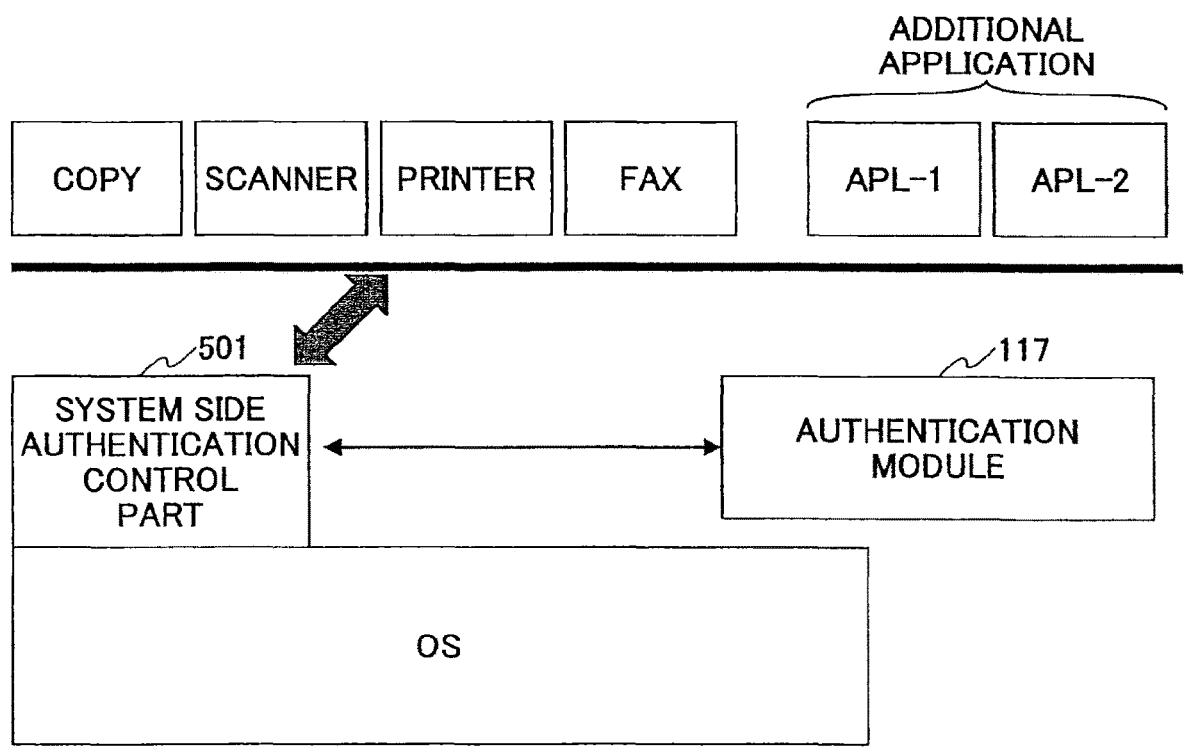
FIG. 18 shows an example of setting information of authentication mode.
FIG. 19 is a figure for explaining an authentication method according to the third embodiment.

In this embodiment, the standard authentication mode or the additional authentication mode is set for each application by using an initial setting screen and the like. FIG. 18 shows an example of setting information. In the example shown in FIG. 18, the standard authentication mode is set for copy application and additional application 2, and the additional authentication mode is set for scanner application and additional application 1. For Fax application, there is no use restriction setting.

Figure 20:
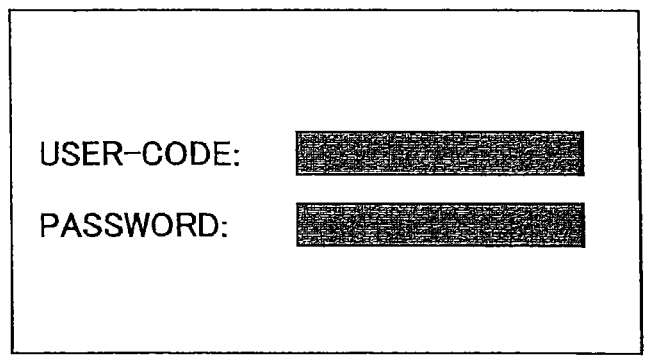
FIG. 20 shows the authentication screen displayed by the system side authentication control part 501.

As shown in FIG. 19 that is a schematic diagram of the compound machine 100, in the additional authentication mode, data input from the authentication screen displayed by the system side authentication control part 501 is passed to the authentication module 117 and an authentication result is passed to the system side authentication control part 501. FIG. 20 shows the authentication screen displayed by the system side authentication control part 501. This authentication screen is called "authentication screen A". The authentication screen A is a screen for prompting for a user code and a password.

Figure 21:
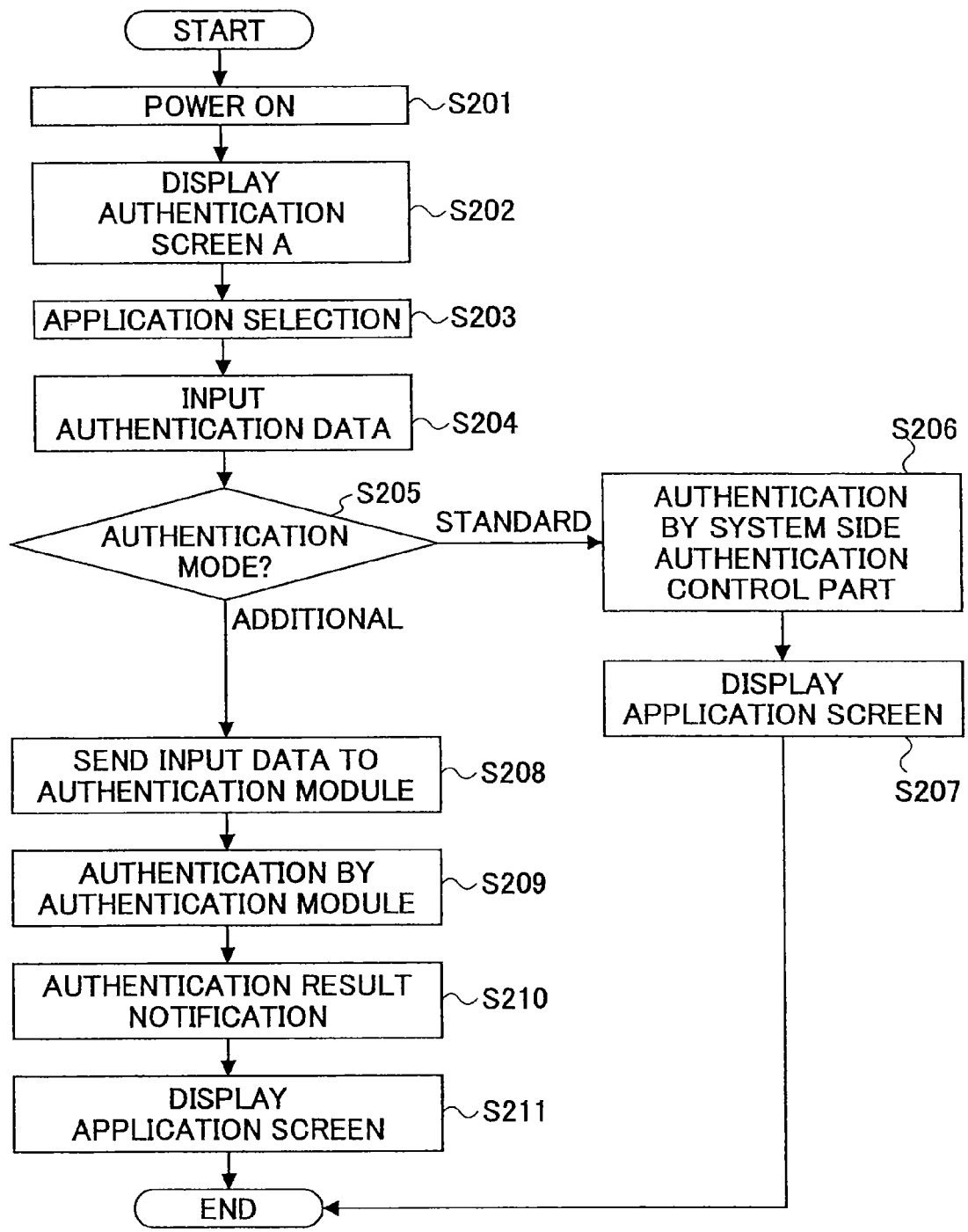
FIG. 21 is a flowchart in the case where the authentication screen displayed by the system side authentication control part is used.

In the following, the operation of this case is described with reference to a flowchart shown in FIG. 21.

After the compound machine 100 is turned on in step S201, the system side authentication control part 501 displays the authentication screen A on the operation panel in step S202. The user selects an application by pushing an application switching key on the operation panel in step S203. In addition, the user inputs the user code and the password from the authentication screen A in step S204. The system side authentication control part 501 obtains the key information.

The system side authentication control part 501 checks the authentication mode for the selected application from the settings shown in FIG. 18 in step S205. If the mode is the standard authentication mode, the system side authentication control part 501 performs the authentication by comparing data stored in the compound machine 100 and the input data in step S206. If the authentication is successful, a screen of the selected application is displayed instead of the authentication screen A in step S207.

If the mode is the additional authentication mode, the system side authentication control part 501 sends the input user code and the password to the authentication module 117 in step S208.

The authentication module 117 performs authentication by referring to authentication data and use restriction data managed by the authentication module 117 on the basis of the input user code and the password in step S209. As a result of the authentication, if the selected application can be used by the user, the authentication module 117 sends a usable notification to the system side authentication control part 501 in step S210. In the case where the authentication module 117 sends the user code and the password to a external server to request authentication, the authentication module 117 sends an authentication result to the system side authentication control part 501 after receiving an authentication result from the server. When the system side authentication control part 501 receives successful notification, the system side authentication control part 501 allows the selected application to display the application's screen, and the application's screen is displayed instead of the authentication screen A in step S211.

[Example Using the Authentication Screen by the System Side Authentication Control Part and the Authentication Screen by the Authentication Module]

Next, an example is explained in which the authentication screen displayed by the system side authentication control part 501 and the authentication screen displayed by the authentication module 117 are used. The mode settings are the same as those shown in FIG. 18 also in this case.

Figures 22, 23:
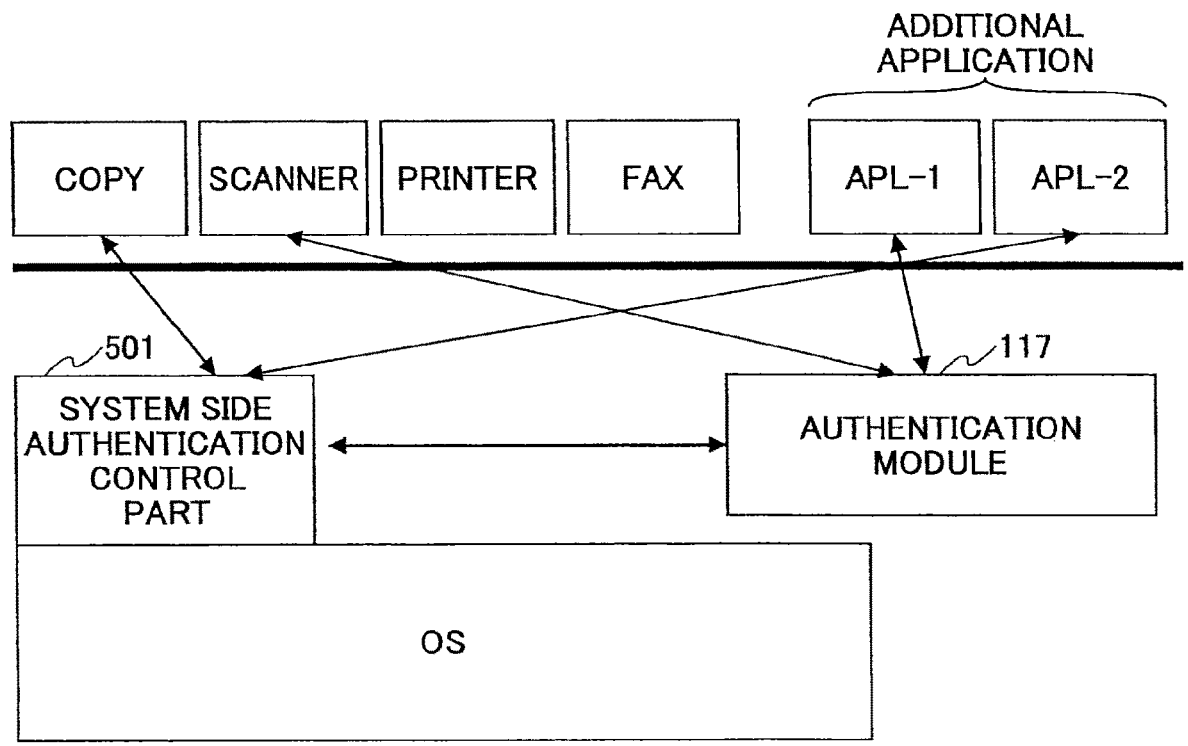
FIG. 22 is a figure for explaining an authentication method of the third embodiment.
FIG. 23 shows an example of the authentication screen displayed by the authentication module 117.

In this example, as shown in FIG. 22, the authentication screen displayed by the authentication module 117 is used for performing authentication for an application corresponding to the additional authentication mode, and the authentication module 117 performs the authentication. For an application corresponding to the standard authentication mode, the authentication screen A displayed by the system side authentication control part 501 is used for performing authentication, and the system side authentication control part 501 performs the authentication. Between the system side authentication control part 501 and the authentication module 117, information on screen release and the like is exchanged. FIG. 23 shows an example of the authentication screen displayed by the authentication module 117. This screen is called "authentication screen B".

Figure 24:
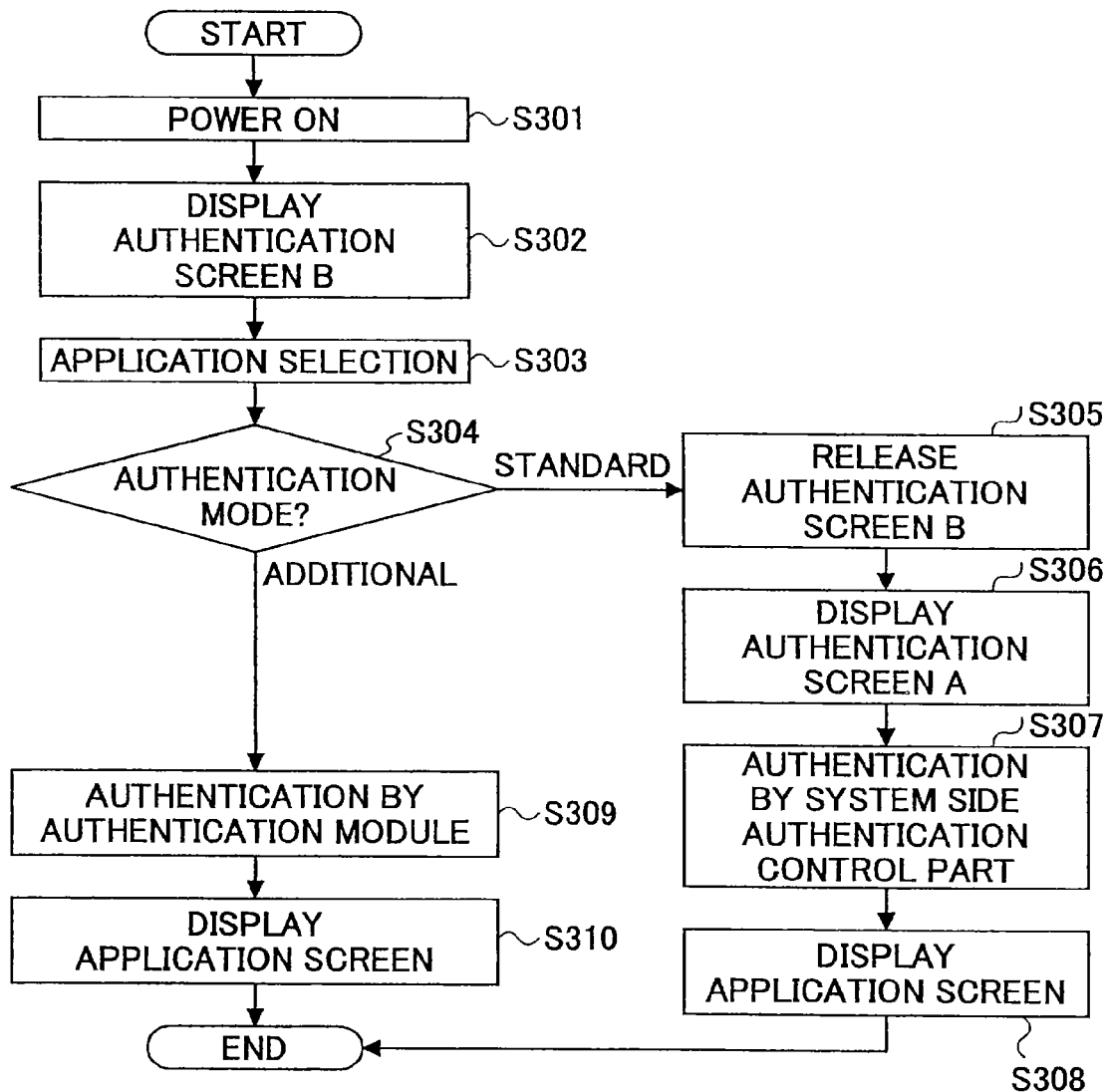
FIG. 24 is a flowchart in the case where the authentication screen by the system side authentication control part and the authentication screen by the authentication module are used.

In the following, the operation of this case is described with reference to a flowchart shown in FIG. 24. In the following process, the authentication module is already set as the priority application.

After the compound machine 100 is turned on in step S301, the authentication module 117 displays the authentication screen B on the operation panel in step S302. The user selects an application by pushing an application switching key on the operation panel in step S303. The authentication module 117 checks the authentication mode for the selected application from the settings shown in FIG. 18 in step S304.

If the mode for the selected application is the standard authentication mode, since the application is not a target of the authentication module 117, the authentication module 117 passes the screen control right to the system side authentication control part 501 in step S305. Then, the system side authentication control part 501 displays the authentication screen A in step S306.

The system side authentication control part 501 performs the authentication by comparing data stored in the compound machine 100 and the input data in step S307. If the authentication is successful, a screen of the selected application is displayed instead of the authentication screen A in step S308, so that the user can use the selected application.

If the mode for the selected application is the additional authentication mode, since the selected application is a target of the authentication module 117, the authentication module 117 performs authentication on the basis of data input from the authentication screen B that is already displayed in step S309. If the authentication is successful, a screen of the selected application is displayed instead of the authentication screen B in step S311, so that the user can use the selected application.

As described in the first embodiment, while the selected application is being used, the screen is returned to the authentication screen B in response to completion of a job such as printing job, system auto clear or the like.

In addition, when an application is selected by pushing an application switching key while the authentication screen A or a screen of another application is displayed, if the selected application is a target of the authentication module 117, the screen is changed to the authentication screen B.

Fourth Embodiment

In the following, the fourth embodiment of the present invention is described.

In the embodiments described so far, data used for authentication is input by the user from the operation panel of the compound machine 100. Alternatively, the data can be input from a PDA (personal digital assistant) or a cellular phone that has data communication capability. In this embodiment, a case where data is input from the PDA or the cellular phone is described.

Figure 25:
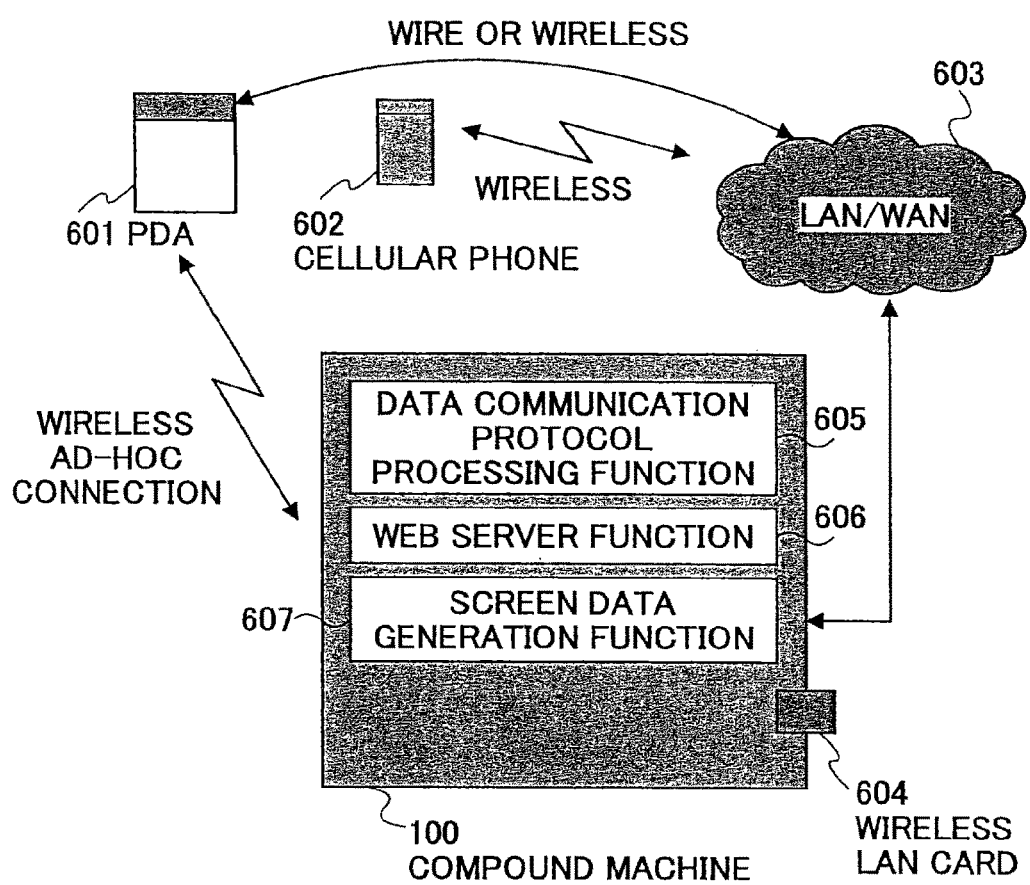
FIG. 25 shows a configuration in which the compound machine 100 communicates with the PDA 601 and the cellular phone 602.

FIG. 25 shows a configuration in which the compound machine 100 communicates with the PDA 601 and the cellular phone 602. As shown in FIG. 25, the compound machine 100 is connected to a network 603 (LAN or WAN such as the Internet). The connection can be realized by either of wired method or wireless method via a wireless LAN card 604. In addition, the compound machine 100 can be provided with a function for directly connecting to the PDA 601 by using an ad-hoc network. In addition, the compound machine 100 can be provided with a function for communicating with the cellular phone 602 by using an extension capability.

The compound machine 100 includes a data communication protocol processing function 605, a Web server function 606, and a screen data generation function 607 for generating authentication screen data. The screen data generation function 607 is provided in the authentication module 117 for example. Other parts of the compound machine 100 are the same as those described so far. By adopting such configuration, data communication can be performed between the compound machine 100 and the PDA 601 or the cellular phone 602. In the following, the operation at the time when authentication is performed is described. The PDA 601 and the cellular phone 602 are collectively called "potable terminal".

First, the portable terminal accesses the compound machine 100 by specifying a URL or an IP address of the compound machine 100. Then, the compound machine 100 generates HTML data or XML data corresponding to a screen for prompting for authentication information, and sends the data to the portable terminal.

The portable terminal that receives the screen data displays a screen such as one shown in FIG. 20 or FIG. 23 on a screen display part of the portable terminal. Then, the user of the portable terminal inputs necessary authentication data and sends the data to the compound machine 100.

By once registering the authentication data in the portable terminal, the input operation becomes easier from the next time. In the case where the cellular phone communicates with the compound machine 100 by using the extension capability in which an extension number is assigned to the compound machine 100 beforehand, by sending the authentication data at the time when the cellular phone originates a call to the compound machine 100, the operation becomes further easier.

The compound machine 100 that receives the authentication data performs authentication by a method described in the third embodiment, for example. When the authentication is successful, the screen of the compound machine 100 changes to a selected application, so that the application can be used. Selection of the application can be performed either on the compound machine 100 or from the portable terminal.

As mentioned above, according to the present invention, an image forming apparatus including applications and system side software for providing system side services to the applications is provided, in which the image forming apparatus includes:

an authentication module for displaying an authentication screen on an operation panel of the image forming apparatus, wherein the authentication module allows the image forming apparatus to display a screen for using the image forming apparatus instead of the authentication screen if authentication data input from the authentication screen satisfies an authentication condition, wherein the authentication module is provided in the image forming apparatus separately from the system side software.

According to the present invention, it is not allowed to change the authentication screen into an screen for using the image forming apparatus unless the authentication condition is satisfied. Thus, by appropriately setting the authentication screen and the authentication condition, use restriction suitable for various objectives can be performed. In addition, since the authentication module is provided separately from the system side software that is unchangeably provided in a ROM and the like, the authentication module can be easily added or changed.

In the image forming apparatus, the system side software may include an authentication function part, and when a specific application is selected by a user, the image forming apparatus refers to information indicating correspondences between each application and the authentication module or the authentication function part, and performs authentication by using the authentication module or the authentication function part that corresponds to the specific application. Accordingly, it becomes possible to use the authentication function part and the additionally provided authentication module selectively for each application.

The image forming apparatus may further includes a part for executing the authentication module from an external recording medium, or a part for loading the authentication module into the image forming apparatus from the external recording medium and executing the authentication module. Therefore, a customized authentication module can be executed as necessary.

The image forming apparatus may further include an authentication module execution part for downloading the authentication module from a server that is connected to the image forming apparatus via a network, and executing the authentication module. The authentication module may be a Java program, and the authentication module execution part includes a class library and a virtual machine. According to this configuration, the authentication module can be added or changed more easily.

The image forming apparatus may further includes a communication part used for performing wireless data communications with a portable terminal, wherein the authentication module performs authentication by using authentication data received from the portable terminal via the communication part. In addition, the image forming apparatus may further includes a part for generating image data corresponding to a screen for prompting for authentication data in the portable terminal, and sending the image data to the portable terminal.

According to the present invention, the authentication data can be input not only from the operation panel but also from the portable terminal such as a PDA and a cellular phone.

In the image forming apparatus, the authentication data may include a section name or a purpose of using an application. Accordingly, authentication for various objectives can be performed.

The compound machine may further include a part for displaying an authentication screen of the authentication module first when the image forming apparatus is started.

According to the present invention, the authentication screen can be immediately displayed after the image forming apparatus is turned on, so that use restriction can be performed.

In the image forming apparatus, if the image forming apparatus detects an end of a job, system auto clear, or a key input instructing to use the authentication module while the image forming apparatus displays a screen other than the authentication screen on the operation panel, the image forming apparatus may display the authentication screen instead of the screen other than the authentication screen.

According to the present invention, even when a job ends after the user leaves the image forming apparatus while using it, the authentication screen can be displayed automatically. In addition, the authentication screen can be also displayed automatically when the system auto clear function works. In addition, the authentication screen can be also displayed automatically by inputting a key for using the authentication module while using the image forming apparatus.

In the image forming apparatus, if the image forming apparatus detects elapse of a predetermined time after an end of a job, the image forming apparatus may launch the system auto clear function and display the authentication screen.

In the image forming apparatus, the authentication module may include a part for collecting log information relating to use of the image forming apparatus. In addition, the authentication module may collect a print completion notification as the log information, and display a warning on the operation panel when the number of sheets printed reaches a predetermined number.

The present invention is not limited to the specifically disclosed embodiments, and variations and modifications may be made without departing from the scope of the present invention.

The invention claimed is:

1. An image forming apparatus comprising:
hardware resources including at least a scanner and a printer;
a memory to store platform software that controls the scanner and the printer, and store software having at least an authentication function that performs user restriction when the software is installed into the image forming apparatus separately from the platform software;
a user interface including a display; and
processing circuitry configured to
cause the display to display an authentication screen to input authentication information of a user before displaying a function selection screen to select a desired function from among a plurality of functions including at least a scanner function and a print function,
receive the authentication information input to the authentication screen, and
cause the display to display the function selection screen, in response to an authentication result based on the authentication information being successful.

2. The image forming apparatus of claim 1, wherein the authentication screen is generated by the software.

3. The image forming apparatus of claim 1, wherein the processing circuitry is further configured to control the display to display the authentication screen when a predetermined time elapses in a state in which there is no user operation.

4. The image forming apparatus of claim 1, wherein the processing circuitry is further configured to control the display to display the authentication screen when a predetermined operation is performed while the function selection screen is being displayed.

5. A method for an image forming apparatus that includes hardware resources including at least a scanner and a printer, a memory to store platform software that controls the scanner and the printer, and store software having at least an authentication function that performs user restriction when the software is installed into the image forming apparatus separately from the platform software, and a user interface including a display, the method comprising:
causing, by processing circuitry, the display to display an authentication screen to input authentication information of a user before displaying a function selection screen to select a desired function from among a plurality of functions including at least a scanner function and a print function;
receiving, by the processing circuitry, the authentication information input to the authentication screen; and
causing, by the processing circuitry, the display to display the function selection screen, in response to an authentication result based on the authentication information being successful.

6. The method of claim 5, wherein the authentication screen is generated by the software.

7. The method of claim 5, further comprising:
controlling, by the processing circuitry, the display to display the authentication screen when a predetermined time elapses in a state in which there is no user operation.

8. The method of claim 5, further comprising:
controlling, by the processing circuitry, the display to display the authentication screen when a predetermined operation is performed while the function selection screen is being displayed.

9. A non-transitory computer-readable storage medium including computer executable instructions, wherein the instructions, when executed by an image forming apparatus that includes hardware resources including at least a scanner and a printer, a memory to store platform software that controls the scanner and the printer, and store software having at least an authentication function that performs user restriction when the software is installed into the image forming apparatus separately from the platform software, and a user interface including a display, cause the image forming apparatus to perform a method, the method comprising:
causing the display to display an authentication screen to input authentication information of a user before displaying a function selection screen to select a desired function from among a plurality of functions including at least a scanner function and a print function;
receiving the authentication information input to the authentication screen; and
causing the display to display the function selection screen, in response to an authentication result based on the authentication information being successful.

10. The non-transitory computer-readable storage medium of claim 9, wherein the authentication screen is generated by the software.

11. The non-transitory computer-readable storage medium of claim 9, further comprising:
controlling the display to display the authentication screen when a predetermined time elapses in a state in which there is no user operation.

12. The non-transitory computer-readable storage medium of claim 9, further comprising:
controlling the display to display the authentication screen when a predetermined operation is performed while the function selection screen is being displayed.

* * * * *